US009767944B2

(12) United States Patent
Galland et al.

(10) Patent No.: US 9,767,944 B2
(45) Date of Patent: Sep. 19, 2017

(54) CELLULOSE NANOFIBRIL DECORATED WITH MAGNETIC NANOPARTICLES

(71) Applicant: Cellutech AB, Stockholm (SE)

(72) Inventors: Sylvain Galland, Lausanne (CH); Richard T. Olsson, Lidingö (SE); Lars Berglund, Åkersberga (SE)

(73) Assignee: CELLUTECH AB, Stockholm (SE)

( * ) Notice: Subject to any disclaimer, the term of this patent is extended or adjusted under 35 U.S.C. 154(b) by 404 days.

(21) Appl. No.: 14/377,276

(22) PCT Filed: Feb. 11, 2013

(86) PCT No.: PCT/SE2013/050115
§ 371 (c)(1),
(2) Date: Aug. 7, 2014

(87) PCT Pub. No.: WO2013/119179
PCT Pub. Date: Aug. 15, 2013

(65) Prior Publication Data
US 2015/0357099 A1      Dec. 10, 2015

Related U.S. Application Data

(60) Provisional application No. 61/598,282, filed on Feb. 13, 2012.

(30) Foreign Application Priority Data

Feb. 10, 2012   (SE) ..................... 1200087

(51) Int. Cl.
H01F 1/117       (2006.01)
H01F 1/375       (2006.01)
(Continued)

(52) U.S. Cl.
CPC ........... *H01F 1/01* (2013.01); *C01G 49/0018* (2013.01); *C01G 49/0072* (2013.01);
(Continued)

(58) Field of Classification Search
CPC ......... H01F 1/01; D06M 11/83; D06M 11/36; D06M 11/49; D06M 2101/06
See application file for complete search history.

(56) References Cited

U.S. PATENT DOCUMENTS 4,911,957 A    3/1990 Oishi et al.
5,143,583 A    9/1992 Marchessault et al.
(Continued)

FOREIGN PATENT DOCUMENTS

CN    102336920 A    2/2012
EP    0200409 A2    11/1986
(Continued)

OTHER PUBLICATIONS

International Search Report and Written Opinion received for PCT Patent Application No. PCT/SE2013/050115, mailed Jun. 3, 2013, 13 pages.
(Continued)

Primary Examiner — Carol M Koslow
(74) Attorney, Agent, or Firm — Morrison & Foerster LLP

(57) ABSTRACT

The present invention relates to cellulose nanofibrils decorated with magnetic nanoparticles as well as a method for the preparation thereof and a material comprising the nanofibrils.

9 Claims, 11 Drawing Sheets

(51) Int. Cl.

| | |
|---|---|
| *B82Y 30/00* | (2011.01) |
| *C08K 3/22* | (2006.01) |
| *C01G 49/02* | (2006.01) |
| *D21C 9/00* | (2006.01) |
| *D21H 11/16* | (2006.01) |
| *D21H 27/00* | (2006.01) |
| *D21H 17/67* | (2006.01) |
| *H01F 1/01* | (2006.01) |
| *D06M 11/83* | (2006.01) |
| *D06M 11/36* | (2006.01) |
| *D06M 11/49* | (2006.01) |
| *C01G 49/00* | (2006.01) |
| *H01F 1/00* | (2006.01) |
| *D06M 101/06* | (2006.01) |
| *B82Y 25/00* | (2011.01) |

(52) U.S. Cl.
CPC .............. *C01G 49/02* (2013.01); *C08K 3/22* (2013.01); *D06M 11/36* (2013.01); *D06M 11/49* (2013.01); *D06M 11/83* (2013.01); *D21C 9/001* (2013.01); *D21H 11/16* (2013.01); *D21H 17/67* (2013.01); *H01F 1/0045* (2013.01); *B82Y 25/00* (2013.01); *C01P 2004/64* (2013.01); *C01P 2006/42* (2013.01); *C08K 2201/01* (2013.01); *C08L 2205/16* (2013.01); *D06M 2101/06* (2013.01); *H01F 1/0063* (2013.01); *Y10T 428/2927* (2015.01); *Y10T 428/2958* (2015.01)

(56) References Cited

U.S. PATENT DOCUMENTS

| | | |
|---|---|---|
| 2004/0146855 A1 | 7/2004 | Marchessault et al. |
| 2005/0245658 A1 | 11/2005 | Mehrotra et al. |

FOREIGN PATENT DOCUMENTS

| | | | |
|---|---|---|---|
| JP | S63-65085 | | 3/1988 |
| WO | 2008/121069 | A1 | 10/2008 |
| WO | WO 2008/121069 | * | 10/2008 |

OTHER PUBLICATIONS

International Preliminary Report on Patentability received for PCT Patent Application No. PCT/SE2013/050115 mailed Aug. 21, 2014, 9 pages.

Chia et al., "Preparation of Magnetic Paper from Kenaf: Lumen Loading and in situ Synthesis Method", American Journal of Applied Sciences, vol. 3, No. 3, 2006, pp. 1750-1754.

Henriksson et al., "An Environmentally Friendly Method for Enzyme-Assisted Preparation of Microfibrillated Cellulose (MFC) Nanofibers", European Polymer Journal, vol. 43, 2007, pp. 3434-3441.

He et al., "Facile In Situ Synthesis of Noble Metal Nanoparticles in Porous Cellulose Fibers", Chemistry of Materials, vol. 15, No. 23, 2003, pp. 4401-4406.

Katepetch et al., "Synthesis of Magnetic Nanoparticle into Bacterial Cellulose Matrix by Ammonia Gas-Enhancing in Situ Co-Precipitation Method", Carbohydrate Polymers, vol. 86, 2011, pp. 162-170.

Liu et al., "Structure and Properties of Cellulose/Fe2O3 Nanocomposite Fibers Spun via an Effective Pathway", The Journal of Physical Chemistry C, vol. 112, 2008, pp. 4538-4544.

Marchessault et al., "In Situ Synthesis of Ferrites in Lignocellulosics", Carbohydrate Research, vol. 224, 1992, pp. 133-139.

Olsson et al., "Controlled Synthesis of Near-Stoichiometric Cobalt Ferrite Nanoparticles", Chemical Material, vol. 17, No. 20, 2005, pp. 5109-5118.

Raymond et al., "In Situ Synthesis of Ferrites in Ionic and Neutral Cellulose Gels", Polymer, vol. 36, No. 26, 1995, pp. 5035-5043.

Sourty et al., "Ferrite-Loaded Membranes of Microfibrillar Bacterial Cellulose Prepared by in Situ Precipitation", Chemistry Materials, vol. 10, No. 7, 1998, pp. 1755-1757.

Balazs et al., "Nanoparticle Polymer Composites: Where Two Small Worlds Meet", Science, vol. 314, Nov. 17, 2006, pp. 1107-1110.

Behrens, Silke, "Preparation of Functional Magnetic Nanocomposites and Hybrid Materials: Recent Progress and Future Directions", Nanoscale, vol. 3, 2011, pp. 877-892.

Dai et al., "Magnetically-Responsive Self Assembled Composites", Chemical Society Reviews, vol. 39, 2010, pp. 4057-4066.

Goh et al., "Hydrothermal Preparation of High Saturation Magnetization and Coercivity Cobalt Ferrite Nanocrystals without Subsequent Calcination", Materials Chemistry and Physics, vol. 120, 2010, pp. 31-35.

Guo et al., "Fabrication and Characterization of Iron Oxide Nanoparticles Reinforced Vinyl-Ester Resin Nanocomposites", Composites Science and Technology, vol. 68, 2008, pp. 1513-1520.

Hoare et al., "A Magnetically Triggered Composite Membrane for On-Demand Drug Delivery", Nano Letters, vol. 9, No. 10, 2009, pp. 3651-3657.

Olsson et al., "Core-Shell Structured Ferrite-Silsesquioxane-Epoxy Nanocomposites: Composite Homogeneity and Mechanical and Magnetic Properties", Polymer Engineering and Science, 2011, pp. 862-874.

Olsson et al., "Making Flexible Magnetic Aerogels and Stiff Magnetic Nanopaper Using Cellulose Nanofibrils as Templates", Nature Nanotechnology, vol. 5, Aug. 2010, pp. 584-588.

PääKKö et al., "Long and Entangled Native Cellulose I Nanofibers Allow Flexible Aerogels and Hierarchically Porous Templates for Functionalities", Soft Matter, vol. 4, 2008, pp. 2492-2499.

Roberts et al., "Wasp-Waisted Hysteresis Loops: Mineral Magnetic Characteristics and Discrimination of Components in Mixed Magnetic Systems", Journal of Geophysical Research, vol. 100, No. B9, Sep. 10, 1995, pp. 17,909-17,924.

Saito et al., "Cellulose Nanofibers Prepared by TEMPO-Mediated Oxidation of Native Cellulose", Biomacromolecules, vol. 8, 2007, pp. 2485-2491.

Sehaqui et al., "Fast Preparation Procedure for Large, Flat Cellulose and Cellulose/Inorganic Nanopaper Structures", Biomacromolecules, vol. 11, 2010, pp. 2195-2198.

Sehaqui et al., "Mechanical Performance Tailoring of Tough Ultra-High Porosity Foams Prepared from Cellulose I Nanofiber Suspensions", Soft Matter, vol. 6, 2010, pp. 1824-1832.

Sun, Changquan Calvin, "Mechanism of Moisture Induced Variations in True Density and Compaction Properties of Microcrystalline Cellulose", International Journal of Pharmaceutics, vol. 346, 2008, pp. 93-101.

Svagan et al., "Towards Tailored Hierarchical Structures in Cellulose Nanocomposite Biofoams Prepared by Freezing/Freeze-Drying", Journal of Materials Chemistry, vol. 20, 2010, pp. 6646-6654.

Wetzel et al., "Epoxy Nanocomposites with High Mechanical and Tribological Performance", Composites Science and Technology, vol. 63, 2003, pp. 2055-2067.

European Search Report for EP 13746162.0, dated Oct. 29, 2015, 5 pages.

First Office Action for CN 2013800088463, dated Jun. 26, 2016, 18 pages. (English translation included).

Galland et al., "Cellulose nanofibers decorated with magnetic nanoparticles—synthesis, structure and use in magnetized high toughness membranes for a prototype loudspeaker," Journal of Materials Chemistry (2013) 1(47):7963.

Klemm et al., "Nanocelluloses: A new family of nature-based materials," Angewandte Chemie International Edition (2011) 50(24):5438-5466.

Office Action for JP 2014-556517, mailed Jan. 31, 2017, 11 pages. (Including English Translation).

* cited by examiner

CELLULOSE NANOFIBRIL DECORATED WITH MAGNETIC NANOPARTICLES

The present invention relates to cellulose nanofibrils decorated with magnetic nanoparticles as well as a method for the preparation thereof and a material comprising the nanofibrils.

BACKGROUND OF THE INVENTION

Magnetic nanoparticles with large surface to bulk ratio is a growing area of interest. Considering the potentially large area of application of magnetic nanoparticles, as filler materials of various polymer materials, it can easily be understood that their relatively poor representation in comparison to micron-sized filler materials in polymers is an effect of the difficulties related to the processing of high-surface area nanoparticles. The explanation mainly lies in the fact that large surface areas also brings problems in achieving uniformly distributed nanoparticle systems due to the favoured particle-particle interaction in comparison to particle-polymer/liquid interactions. The result is often severe agglomeration and aggregates of nanoparticles. The agglomerates in turn affect many macroscopic properties, such as mechanical, optical and magnetic etc. since these properties on a macroscopic scale are affected by the degree of close interaction at the nano scale level. In order to exploit the effects of nano-sized magnetic nanoparticles employed as fillers in organic matrix materials, the control over dispersion is therefore an unavoidable prerequisite.

Ferrite-loaded membranes of microfibrillated cellulose have been prepared by mixing metal ions to a suspension of bacterial cellulose under $N_2$ atmosphere before precipitation by NaOH followed by oxidation in atmospheric air. Ferrite particles were inclined to aggregate into lumps in the fibrillar network Sourty H.; et al., Chem. Mater. 1998, 10 7), 1755-1757). A magnetic paper made of kenaf has been prepared by precipitation of magnetic nanoparticles in a pulp suspension under anaerobic conditions. Chia C. H. et al., Am. Appl. Sci., 2006, 3 3), 1750-1754).

Magnetic membranes with improved and controlled properties are of interest for purification/filtration (Dai Q., et al., Chem Soc Rev, 2010, 39, 4057), magneto-responsive actuators (Hoare, T. et al., Nano Lett, 2009, 9, 3651. Behrens S., Nanoscale, 2011, 3, 877) as well as for large scale manufacturing of e.g. magneto-acoustic membranes, anticounterfeiting papers, radio-frequency materials and flexible data storage. The magnetic nanocomposite membranes and films are classically derived from polymers mixed with surface modified functional magnetic nanoparticles (Behrens S., Nanoscale, 2011, 3, 877).

However, the dispersion of the high surface area nanoparticles is more challenging and nanoparticle agglomerates tend to form easily. Strength and failure properties are sensitive to such agglomerates so that the materials become brittle even at moderate nanoparticle loadings. The presence of agglomerates also makes it difficult to predict magnetic composite properties as related to intrinsic nanoparticle magnetics due to dipolar interactions (Olsson R. T., et al., Polym Eng Sci, 2011, Article in Press). In addition, the classical preparation methods (Behrens S., Nanoscale, 2011, 3, 877) are time consuming and costly since in most cases they rely on empirical attempts to find particle surface coatings for improved dispersions (Balazs A. C., et al., Science, 2006, 314, 1107).

Recent progress in the field of bio-nanotechnologies has shed light on the possibilities offered by some naturally occurring nano-building blocks (Eichorn S. J., et al. J Mater Sci, 2010, 45, 1). At the smallest scales of the wood cell wall organization, cellulose I microfibrils (3-5 nm wide) aggregate during wood pulping to form nanofibrils with dimensions in the range 5-20 nm in width and up to few micrometers in length. These entities can be released from the pulp fiber cell wall by mechanical disintegration (A. F. Turbak, et al., J Appl Polym Sci, 1983, 37, 815), which is facilitated by an enzymatic or chemical pre-treatment of the pulp fibers (M. Henriksson, et al., Eur Polym J, 2007, 43, 3434 and Saito T. et al., Biomacromolecules, 2007, 8, 2485). Due to their intrinsically high strength and stiffness (modulus of crystal exceeding 130 GPa (Sakurada I. et al., J Polym Sci, 1962, 57, 651)), long and slender cellulose nanofibrils (NFC) have interesting potential as nanoreinforcements in various composite materials. Furthermore, strong interfibril interactions allows formation of a variety of nanostructures, from dense nanopapersto ultra-light aerogels and foams (Henriksson, M. et al., Eur Polym J, 2007, 43, 3434; Pääkkö, M. et al., Soft Matter, 2008, 4, 2492; Sehaqui, H. et al., Soft Matter, 2010, 6, 1824; and Svagan, A. J. et al., J Mater Chem, 2010, 20, 6646). Here, the fibrillar interactions and the corresponding network structure provide favourable mechanical properties. Large-scale availability, origin from renewable resources, and low resource cost are advantages of forest-derived nano-building blocks.

Bacterial cellulose nanofibril networks have been used as a template for precipitation of magnetic nanoparticles (R. T. Olsson, et al., Nat Nanotechnol, 2010, 5, 584). The method allowed to form cellulose-based magnetic aerogels, as well as dense membranes. A two-step method for preparing a magnetic nanoparticle cellulose material, wherein cobalt ferrite nanoparticles are evenly/finely distributed arranged on the scaffold of fibres inside the material is disclosed in WO2008/121069. The disclosed material is in the form of a hydrogel or aerogel and the fibres in the material are physically entangled. However, the methods are energy consuming due to the freeze-drying steps of the cellulose network prior to nanoparticle precipitation. Furthermore, the versatility for nanostructure formation is restricted by the characteristics of the network synthesized by the bacteria, which to some extent predicted the relative density/frequency of the magnetic nanoparticles as related to reactive sites for grafting the inorganic nanoparticles.

A common problem with previous methods is to achieve reproducibly coated nanoparticles, making the combined mechanical and magnetic functionality of "classical" polymer matrix nanocomposites difficult to achieve. There is a need within the technical field of magnetic nanoparticle cellulose material to be able to tailor the magnetic properties of the material.

SUMMARY OF THE INVENTION

It is an object of the present invention to provide cellulose nanofibrils decorated by magnetic nanoparticles, wherein the nanoparticles are uniformly distributed on the nanofibril. Another object of the present invention, is to provide a single-step method for the preparation of such cellulose nanofibrils. A further object is to provide a magnetic material comprising the cellulose nanofibrils that is decorated by magnetic nanoparticles in a uniform distribution on the nanofibril.

It has surprisingly been found that cellulose nanofibrils, wherein each nanofibril is decorated with magnetic nanoparticles that are uniformly distributed on the nanofibril, can be obtained by a method comprising the steps of:

a) diluting cellulose nanofibrils in a solvent to obtain a suspension,
b) adding at least one metal salt to the suspension obtained in step (a) in any atmosphere that allows oxidation to form metal ion complexes that are physically attached to the nanofibrils,
c) precipitating the metal ion complexes by forced hydrolysis to form magnetic nanoparticles on the cellulosic nanofibrils in the suspension,
d) allowing the suspension in step (c) to react until the metal ion complexes have been converted to the magnetic phase.

The method of the present invention is a single-step process for the preparation of cellulose nanofibrils decorated by magnetic magnetic nanoparticles. This method is inexpensive and rapid compared to previously known methods for preparing cellulose material loaded with nanoparticles.

A further object of the present invention is to provide nanocomposite membranes composed of an intermingled network of cellulose nanofibrils decorated with magnetic nanoparticles. The decorated cellulose nanofibrils of the present invention can be formed into large and strong cellulose nanocomposite membranes by vacuum filtration. Nanofibril entanglements and interactions result in high strength and toughness of the nanocomposite membranes formed.

The presented platform for direct inorganic modification of cellulose nanofibrils allows for uniform distribution of nanoparticles in fiber composites in absence of surfactants or particle surface modifications.

DETAILED DESCRIPTION OF THE INVENTION

Figure 1:
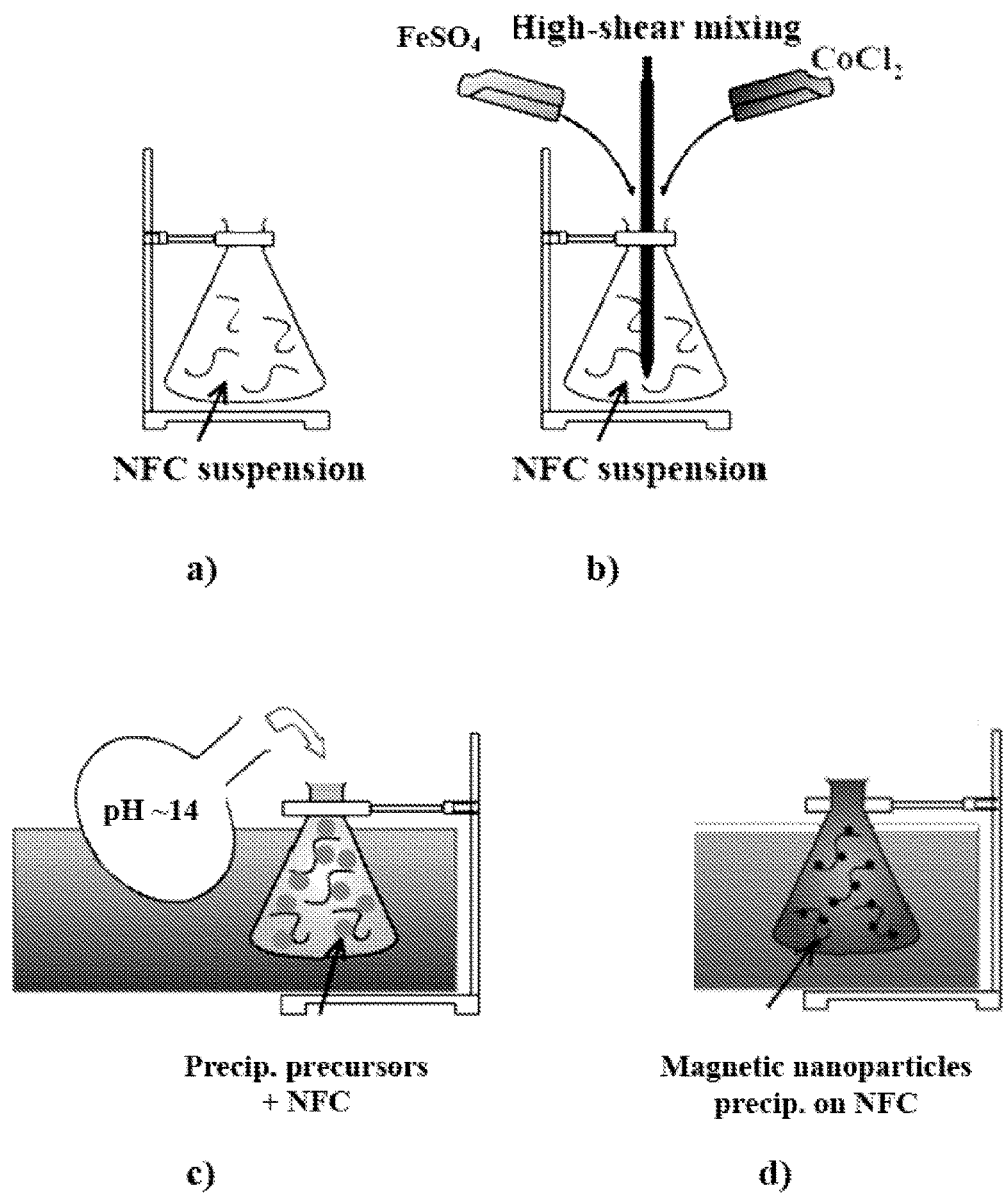
FIG. 1 illustrates the method for in-situ preparation of cobalt ferrite nanoparticles on cellulose nanofibrils.

A first aspect of the invention is a cellulose nanofibril decorated with magnetic nanoparticles, wherein the magnetic nanoparticles are uniformly distributed on the fibril.

Another aspect of the present invention is a magnetic material comprising cellulose nanofibrils decorated with magnetic nanoparticles, wherein the magnetic nanoparticles are uniformly distributed on the fibril.

A distinct advantage with the cellulose nanofibrils of the present invention is that the magnetic properties of the magnetic material comprising cellulose nanofibrils can be tailored by mixing cellulose nanofibrils decorated with hard magnetic nanoparticles with cellulose nanofibrils decorated with soft magnetic nanoparticles.

For purposes of this invention, the term "cellulose material" is intended to encompass native cellulose. Cellulose is found in plants, a few animals and a few bacteria as microfibrils 2-20 nm in diameter depending on organism source. Cellulose material exists in nature as reinforcing phase in plant cell walls, and in other organisms such as bacteria or tunicate animals. Cellulose is found in cotton, paper, wood pulp etc. Several different crystalline structures of cellulose are known, natural cellulose is denoted cellulose I, with structures $I_\alpha$ and $I_\beta$. Cellulose produced by bacteria and algae is enriched in $I_\alpha$ while cellulose of higher plants consists mainly of $I_\beta$. Cellulose in regenerated cellulose fibers, such as rayon and cellophane, is denoted cellulose II.

The term "microfibrillated cellulose", abbreviated MFC, is used for nanosized cellulose fibrils disintegrated from a cellulose material. The starting form of microfibrillated cellulose (MFC) is typically as a suspension of MFC in liquid, where the solid MFC content is less than 10% by volume. It is found in the form of crystalline microfibrils consisting of polyglucan molecules in extended chain conformation. The length can be several micrometers and therefore the aspect ratio (ratio of length to diameter) is very large.

The term "cellulose nanofibrils", also called "nanofibrillated cellulose" and abbreviated NFC, is used for fibrillar material extracted from pulp that prior to mechanical disintegration, such as in a microfluidizer or homogenizer, has been subjected to chemical and/or enzymatic pre-treatments.

The term "cellulose nanofibril" is intended to encompass a particle with the smallest dimension in the range 5-100 nm.

The cellulose nanofibrils are fiber-shaped with one dimension (diameter/width/lateral dimension) smaller than the other (length/longitudinal dimension). Typically, the aspect ratio (length/width) is above 10. The cellulose structure in the particle is cellulose I or cellulose II. The surface of the cellulose nanofibril may be chemically modified (ie acetylated, carboxylated, silanised, or modified by other functional groups) whereas the interior of the cellulose nanofibril is cellulose I or celllulose II.

The term "bacterial cellulose" is intended to encompass any type of cellulose produced via fermentation or synthesised of a bacteria of the genus, *Alacaligenes, Pseudomonas, Acetobacter*, such as *Acetobacter xylinum* (also called *Gluconacetobacter xylinum*), *Rhizobium, Agrobacterium, Sarcina, Enterobacter, Achromobacter*, and *Azotobacter* and includes materials referred popularly as microfibrillated bacterial cellulose, reticulated bacterial cellulose, microbial cellulose and the like. In addition prokaryotic organisms such as the prokaryotic cyanophycean alga *Nostoc* are encompassed. Further, the term "bacterial cellulose" as used in this invention refers to a product essentially free of residual bacteria cells made under agitated culture conditions by a bacterium of the genus *Acetobacter*. Bacterial celluloses are normally available in a gel produced by the bacteria.

For purposes of this invention, the term "nanofibrils decorated with magnetic nanoparticles" is intended to encompass nanofibrils having magnetic nanoparticles attached to the nanofibril along its surface.

The term "magnetic cellulose" is intended to encompass a material, referred to as a material consisting of both an inorganic particles fraction/phase with magnetic properties and an organic carbon-based phase/fraction. The magnetic cellulose can be ferromagnetic, ferri-magnetic or superparamagnetic.

The term "magnetic nanoparticles" is intended to encompass nanoparticles made of transition metal ions and their oxides, such as ions and oxides selected from Co, Fe, Ni, $Fe_2O_3$, $Fe_3O_4$, $CoFe_2O_4$, $NiFe_2O_4$, $CuFe_2O_4$, $MnFe_2O_4$, $MgFe_2O_4$, and mixtures of different transition metal ions in the same lattice. The magnetic nanoparticles may be selected from ferromagnetic, ferrimagnetic and superparamagnetic nanoparticles.

The term "mild oxidation agent" is intended to encompass any type of oxidating media which is capable of oxidizing ferrous ions to ferric ions, or any of the transition metals mentioned herein to a higher oxidation state, to a sufficient extent that magnetic particles can be obtained, for example ferrites. Examples of mild oxidation agents are selected from the group comprising metal salts of chlorates, perchlorates, bromates, nitrates and nitrites, as well as nitrous acid, such as potassium nitrate ($KNO_3$), potassium chlorate ($KClO_3$), sodium chlorate ($NaClO_3$), potassium bromate ($KBrO_3$), potassium perchlorate ($KClO_4$), are ammonium nitrate ($NH_4NO_3$).

The term "transition metal ions" is intended to encompass metal ions such as all elements in the periodic table that can be used to obtain ironoxide based magnetic nanoparticles.

The term "coordination compounds and d-block elements" is intended to encompass metal compounds and/or elements such as manganese, iron, cobalt, zinc etc. d-block elements are also referred to as transition metals, the d-block elements in period 4 are Sc, Ti, V, Cr, Mn, Fe, Co, Ni, Cu, Zn.

The term "alkaline solution" is intended to encompass NaOH, KOH, LiOH, $NH_3$, and the like.

The term "metal ion complex" is intended to encompass coordination complexes that are created upon dissolving metal salts in a liquid phase, for example metal oxide hydroxide complexes or any metal hydroxide or oxide formed, or combinations thereof.

The term "freeze drying" is intended to encompass a method to sublime solid water (ice) to gas phase.

The term "metal salt" is intended to encompass salts of metal ions such as $Co^{2+}$, $Fe^{2+}$, $Fe^{3+}$, $Mn^{2+}$, $Cu^{2+}$, $Ni^{2+}$ and $Mg^{2+}$ and the like, in the form of salts, such as $FeSO_4$, $Fe_2(SO_4)_3$, $FeCl_2$, $FeCl_3$, $Fe(NO_3)_2$, $Fe(NO_3)_3$, $Fe(C_2H_3O_2)_2$, $Fe(C_2H_3O_2)_3$, $FePO_4$, $MnSO_4$, $MnCl_2$, $Mn(NO_3)_2$, $Mn(C_2H_3O_2)_2$, $CoSO_4$, $CoCl_2$, $Co(NO_3)_2$, $Co(C_2H_3O_2)_2$, $ZnCl_2$, $CuSO_4$, $NiCl_2$, and their corresponding hydrates, such as $CoCl_2.6H_2O$, and $FeSO_4.7H_2O$.

The term "magnetic nanoparticle cellulose material" is intended to encompass a material comprising an interconnected fibre network.

As used herein, the "weight percentage" (wt %) of magnetic or inorganic nanoparticles, refers to the average weight fraction of inorganic particles on the modified cellulose nanofibrils, of the total weight of the modified cellulose nanofibrils.

The term "magnetic nanoparticles physically attached on the cellulose material" is intended to encompass magnetic nanoparticles in the size region 1-200 nm.

The term "uniformly distributed" is intended to encompass that the nanoparticles are mostly separated, i.e. no agglomerate formation.

The term "agglomerate" is defined herein as a collection of nanoparticles adhering together or laying very close together, i.e. ≤5 nm particle to particle inter-distance and the collection of nanoparticles is composed of 20 or more nanoparticles. An agglomerate material (nonuniform) would have more than 30% of the nanoparticles lying in above entities of 20 or more nanoparticles.

The bacterial cellulose utilized herein may be of any type associated with the fermentation product of *Acetobacter* genus microorganisms, and was previously available from CPKelco U.S. under the tradename CELLULON®.

In one embodiment of the present invention, the magnetic nanoparticles are made of transition metal compounds or an oxide thereof, such as a compound selected from of Co, Fe, Ni, $Fe_2O_3$, $Fe_3O_4$, $CoFe_2O_4$, $NiFe_2O_4$, $CuFe_2O_4$, $MnFe_2O_4$, and $MgFe_2O_4$. The magnetic nanoparticles can be ferromagnetic, ferrimagnetic or superparamagnetic.

Another aspect of the invention, is a method for forming cellulose nanofibrils decorated with magnetic nanoparticles that are uniformly distributed on the cellulose nanofibrils comprising the steps of:
  a) diluting cellulose nanofibrils in a solvent to obtain a suspension,
  b) adding at least one metal salt to the suspension obtained in step a) in any atmosphere that can allow oxidation to form metal ion complexes physically attached to the nanofibrils,
  c) precipitating the metal ion complexes by forced hydrolysis to form magnetic nanoparticles on the cellulosic nanofibrils in the suspension,
  d) allowing the suspension in step c) to react until the metal ion complexes have been converted to the magnetic phase.

The method according to the present invention is illustrated in FIG. 1. According to the method of the present invention the magnetic nanoparticles are prepared in situ with the suspension of cellulose nanofibrils and are allowed to attach to said nanofibrils in said suspension.

Preferably, water is used as the solvent for dilution in step a). The dilution of cellulose nanofibers may be made in any atmosphere that can allow oxidation, such as atmospheric air.

The at least one metal salt added to the suspension in step b) may be added in the form of a solid metal salt or as a solution of metal ions. When the at least one metal salt is added in as a solution of metal ions, said solution should be prepared immediately before it is added to the suspension. Preferably, the at least one metal salt is added to the suspension in step b) in the form of a solid metal salt.

Preferably, the at least one metal salt added to the suspension in step b) is a combination of at least two metal salts selected from salts of the divalent or trivalent atoms from the d-block elements in the periodic table, such as $Co^{2+}$, $Fe^{2+}$, $Mn^{2+}$, $Ni^{2+}$, $Zn^{2+}$, $Cu^{2+}$ and $Fe^{3+}$, as well as hydrates of such salts. Specific examples of suitable metal salts are $FeSO_4$, $Fe_2(SO_4)_3$, $FeCl_2$, $FeCl_3$, $Fe(NO_3)_2$, $Fe(NO_3)_3$, $Fe(C_2H_3O_2)_2$, $Fe(C_2H_3O_2)_3$, $FePO_4$, $MnSO_4$, $MnCl_2$, $Mn(NO_3)_2$, $Mn(C_2H_3O_2)_2$, $CoSO_4$, $CoCl_2$, $Co(NO_3)_2$, $Co(C_2H_3O_2)_2$, $NiCl_2$, $ZnCl_2$, $CuSO_4$ and their hydrates. Preferably, the metal salts are selected from salts of $Co^{2+}$, $Fe^{2+}$, $Mn^{2+}$, and $Fe^{3+}$, as well as hydrates of such salts. More preferably, the metal salts are selected from $FeSO_4$, $CoCl_2$, $MnCl_2$, $FeCl_3$ and their hydrates.

The combination of metal salts may be added to the suspension in step b) in the form of solid metal salts or as a solution of metal ions. When the combination of metal salts is added as a solution of metal ions, said solution should be prepared immediately before it is added to the suspension. Preferably, the metal salts are added to the suspension in step b) in the form of solid metal salts.

Preferably, the at least one metal salt is added to the suspension of cellulose nanofibrils under high-shear mixing in step b). The at least one metal salt added to the suspension in step b) may be mixed at room temperature with the suspended cellulose nanofibrils.

In the method according to the present invention step b) is performed in any atmosphere that can allow oxidation, such as atmospheric air. The oxidating atmosphere oxidises the metal ions in the aqueous suspension to metal ion complex, such as metal oxide-hydroxide complexes, metal ion hydroxide complexes or metal ion oxide complexes, that attach to the cellulose nanofibrils in the suspension. The mechanisms for the interaction between the metal species and the cellulose nanofibrils are understood to rely on the interaction between the formed metal ion complexes and the hydroxyl functional groups on the cellulose nanofibrils. The metal ion complexes that are attached to the cellulose nanofibrils act as precursors and serve as nucleation points for the precipitation of the magnetic nanoparticles. Since the metal ion complexes are firmly attached to the nanofibrils that are dispersed in the suspension prior to the formation of the magnetic nanoparticles, associations and agglomerations of the precipitated magnetic nanoparticles are prevented.

Preferably, the metal ion complexes formed in the suspension of cellulose nanofibrils in step b) are selected from the coordination compounds including divalent or trivalent atoms from the d-block elements in the periodic table, such as $Co^{2+}$, $Fe^{2+}$, $Mn^{2+}$, $Fe^{3+}$ and their metal ion oxide-hydroxide complexes, metal ion hydroxide complexes or metal ion oxide complexes. The concentration range could be between 0.005 molar—saturated solution.

The method of the present invention results in uniform distribution of the magnetic nanoparticles even at very high inorganic nanoparticle contents, such as at a content of more than 80 wt % inorganic nanoparticles.

A further advantage of grafting of the nanoparticles onto the individual nanofibrils is that the modified suspension can be diluted to various concentrations and the average distance between the nanofibrils could thus be varied during conversion of the inorganic phase into solid particles. Further, less tedious cleaning procedures from remaining counter ions, i.e. post particle synthesis is required.

Another advantage with the method according to the present invention is that it permits complete condensation of the inorganic phase onto the cellulose nanofibrils so that no partide sediment separates from the suspension of nanofibrils even after long periods of time, such as after 2 months; or after exposure to strong magnetic fields, such as when a 20 $cm^3$-1.2 T magnet is placed under the suspensions; or ultrasonication, for example at an energy of 300 W during 2 min.

Figure 2:
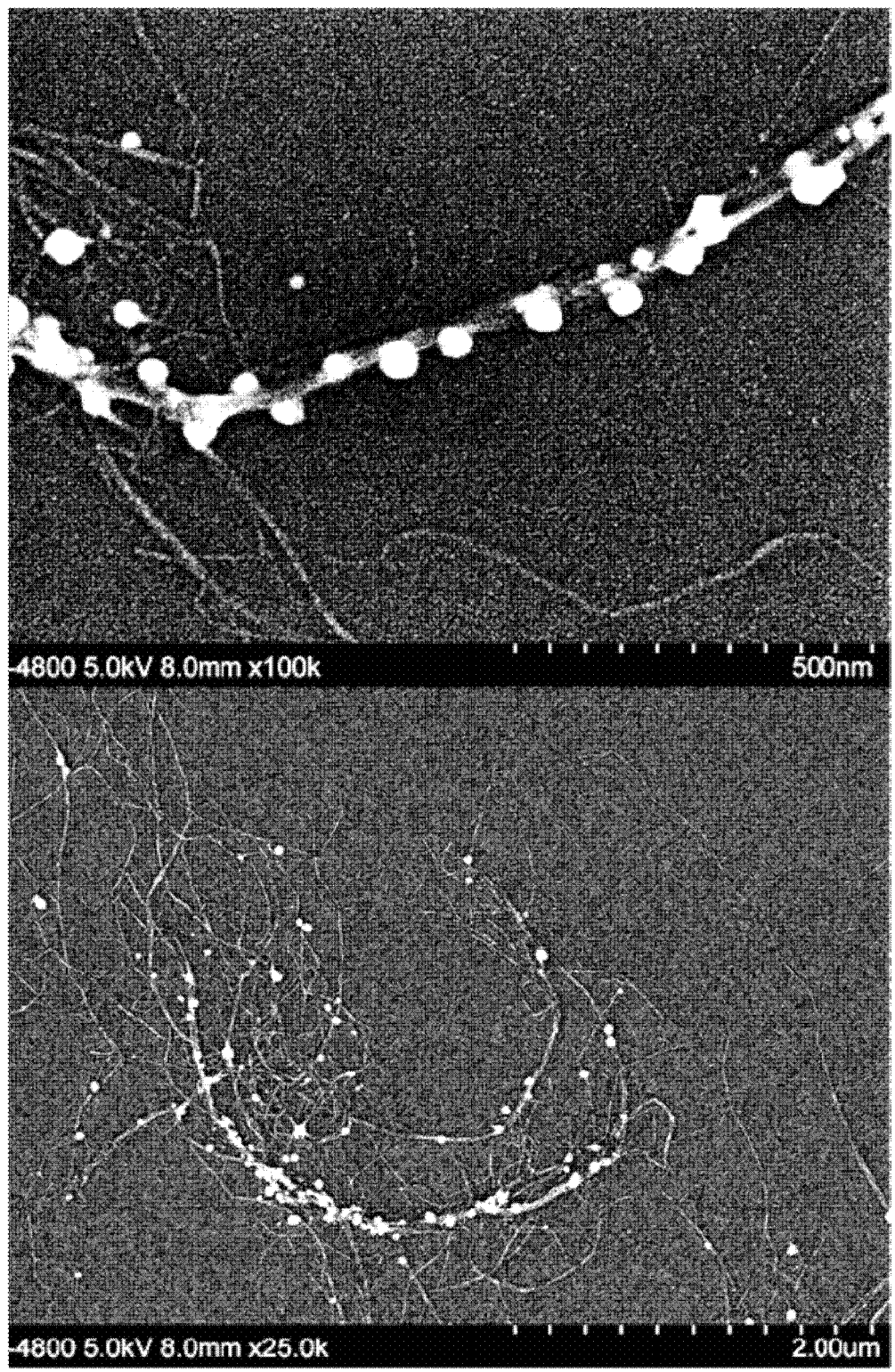
FIG. 2 shows SEM micrographs of functionalized nanofibrils (30 wt % cobalt ferrite nanoparticles) deposited from a dilute aqueous suspension (0.001%), showing different morphologies encountered.

A yet further advantage with the cellulose nanofibril decorated with magnetic nanoparticles according to the present invention is that the magnetic nanoparticles are strongly attached to the nanofibrils. This has the effect that a material made from the cellulose nanofibrils according to the present invention is more resistant to fragmentation. The morphology of magnetic nanoparticles attached to the nanofibril is shown in FIG. 2.

Preferably, the suspension of nanofibrils with metal ion complexes obtained in step b) is heated before the forced hydrolysis in step c). Preferably the suspension of nanofibrils with attached metal ion complexes obtained in step b) is heated to at least 70° C., more preferably to at least 80° C., even more preferably to at least 90° C. Typically, the heating rate is any heating rate between about 0 and about 10° C./min, for example about 2° C./min. Heating the suspension in step b) promotes the attachment of the complexes to the nanofibrils.

Preferably, the forced hydrolysis in step c) is performed by the addition of an alkaline solution, such as a solution with a pH>7, or >8, or >9, or >10, or >11, or >12, or >13, or =14.

Preferably, the alkaline solution in step (c) is chosen from an ammonium solution, a solution of an alkali metal hydroxide, or the like, such as $NH_3$, NaOH, KOH and LiOH, or a mixture thereof, providing a pH above 7.

Preferably, the alkaline solution in step c) comprises a dissolved mild oxidation agent. The oxidation agent oxidises the metal ions to their preferred state in magnetic nanoparticles. Preferably, the mild oxidation agent is selected from the group comprising metal salts of nitrates, nitrites, chlorates, perchlorates and bromates, as well as nitrous acid. More preferably, the mild oxidation agent is selected from metal salts of nitrates and nitrites. Even more preferably the mild oxidation agent is $KNO_3$. Preferably, the alkaline solution in step c) comprising a dissolved mild oxidation agent has an initial pH of above 7. In a specific embodiment the alkaline solution in step (c) comprises NaOH and $KNO_3$.

The alkaline solution in step (c) is preferably heated before addition to the suspension. More preferably, the alkaline solution in step c) is heated to above 50° C., at 1 atm before addition to the suspension. If ammonium is used as the alkaline solvent, the solvent may have ambient temperature.

The magnetic nanoparticles can be referred to as superparamagnetic, paramagnetic, ferri-magnetic or ferro-magnetic and thus showing such properties.

The method wherein step (d) proceeds until the agglomerate free and evenly distributed ion-complexes that are physically attached on the cellulose nanofibrils are converted to magnetic nanoparticles.

In any embodiment of the present invention a polymer may be added after step d).

In one embodiment, the cellulose nanofibrils of the present invention could be made from a cellulose material chosen from a plant, a tree, pulp or cotton. Preferably, the cellulose nanofibrils are obtained from wood pulp. For example the cellulose nanofibrils of the present invention could be obtained by chemical and/or enzymatic pre-treatment of the wood pulp followed by mechanical treatment. Preferably, the cellulose nanofibrils of the present invention are obtained by enzymatic pre-treatment of the wood pulp followed by mechanical treatment, such as in a microfluidizer.

With the method of the present invention, each individual cellulose nanofibril is decorated with nanoparticles that are uniformly distributed over the nanofibril. Since the nanoparticles are uniformly distributed along each nanofibril, it is possible to form a nanocomposite with highly uniform distribution of the nanoparticles throughout a nanofibril network. It could be concluded that an advantage with the method according to the present invention is that it produces extremely evenly distributed and physically attached nanoparticles in a lightweight cellulosic nanofibril network.

The decorated cellulose nanofibrils of the present invention can be present in a liquid suspension. In a liquid suspension of cellulose nanofibrils, the cellulose nanofibrils are well dispersed in the liquid. This liquid suspension is in liquid form with a measurable viscosity. The cellulose nanofibrils are not strongly attached to each other. If the suspension is diluted, the average distance between the cellulose nanofibrils is increasing. This is in contrast to a hydrogel of cellulose nanofibrils since the strong interaction between the cellulose nanofibrils in a hydrogel prevents increased average interparticle distance.

An advantage with the cellulose material prepared from the cellulose nanofibrils of the present invention, is that the work to fracture is several times higher than for nanocomposites from most other classical engineering polymers. The mechanical properties of the cellulose material may be varied by controlling the cellulose nanofibril interaction by water molecules.

In a network made up of cellulose nanofibrils the nanoparticles are disrupting the network, thus reducing interfibril interactions and introducing porosity. The different mechanical behaviour between a material made from fibrils prepared according to the one-step method of the present invention and a material obtained by the previously known two-step preparation method depends on the different microstructures. In a material made by nanofibrils obtained in a two-step method the magnetic nanoparticles are precipitated separately and then only mixed with the nanofibrils, resulting in a formation of relatively large aggregated regions of sizes up to a few micrometers, of nanoparticles located in pockets between condensed bundles nanofibrils that may allow for sliding between aggregated, strong, continuous cellulose nanofibril sheets. Efficient stress transfer would then be enhanced along the interdividing walls between the pockets, making the material less resistant to rupture.

The dispersion of single domain magnetic nanoparticles can be controlled in the method of the present invention by introducing cellulose nanofibrils prior to precipitation and formation of nanoparticles. The average distance between the nanofibrils in the suspensions (regardless of the concentration of metal salts) is on the order of 200 nm, which is sufficient to allow for directed condensation of the metal ion onto the surfaces of the fibril. The nanoparticles are evenly distributed along the fibril surfaces, as can be seen from FIG. 2. The uniform distribution of particles can be traced back to the relatively uniform condensation of metal ion complexes along the cellulose nanofibrils before the conversion of the metal ions into its ferromagnetic phase.

The method according to the present invention provides for a new type of nanoscale building block that results in the form of individual cellulose nanofibrils decorated by inorganic nanoparticles. The method allows complete metal ion condensation of the inorganic precursors as magnetic spinel crystals on the fibril.

Figure 3:
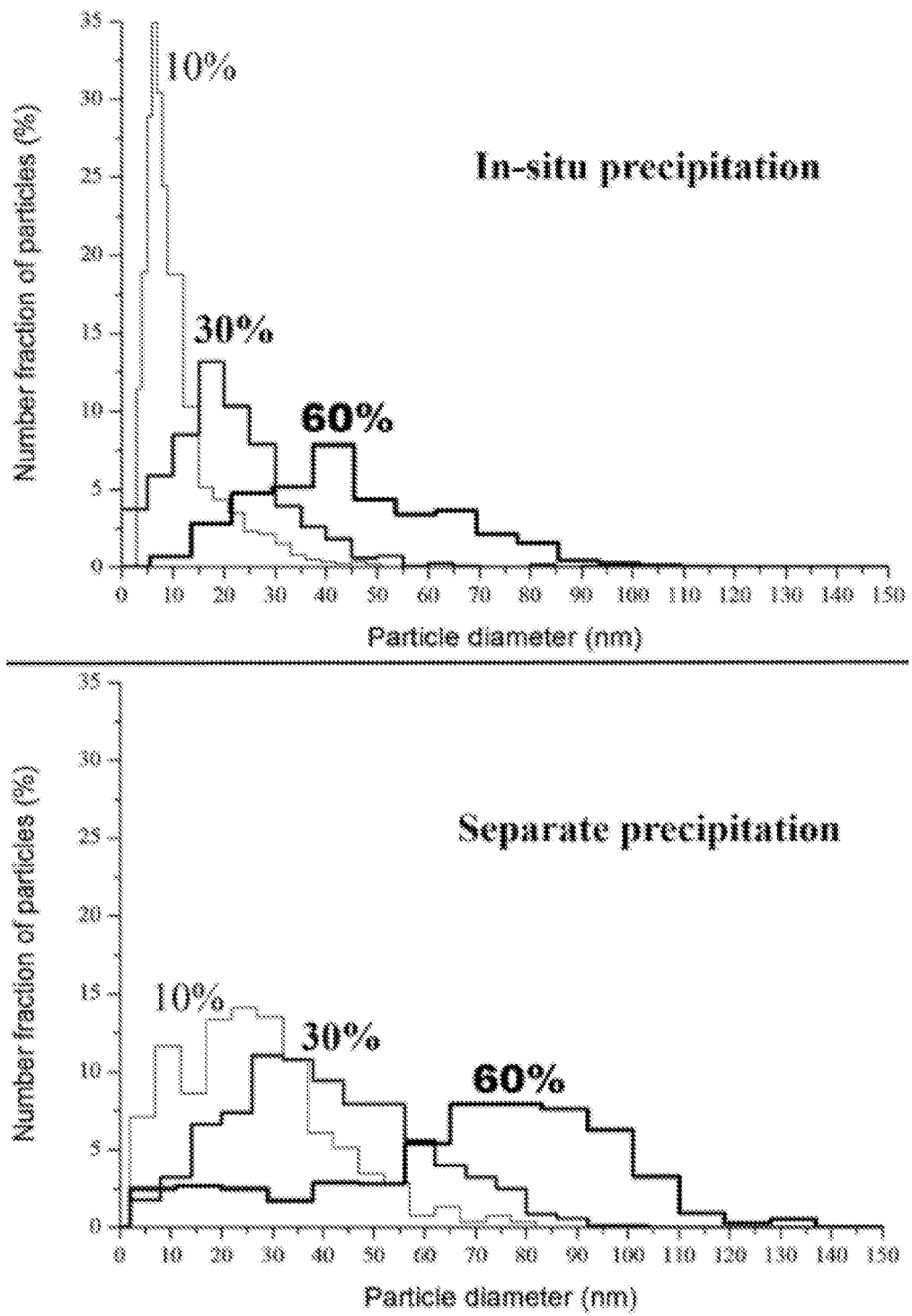
FIG. 3 shows number average size distributions of magnetic nanoparticle (cobalt ferrite) for in-situ preparation according to the present invention compared to a two-step process. Three material compositions are presented in each graph. The percentages refer to various average weight fractions of inorganic particles (10 wt %, 30 wt %, 60 wt %) on the cellulose nanofibrils.

Crystal growth is influenced by the presence of cellulose nanofibrils in suspension, leading to formation of smaller nanoparticles. Nanoparticles prepared in presence of cellulose nanofibrils as in the method according to the present invention have significantly smaller average sizes as well as more narrow size profiles than particles obtained during synthesis in absence of fibrils using the same metal ion concentrations as in a two-step process, wherein metal salts are precipitated and converted to magnetic phase before addition to a suspension of cellulose nanofibrils, as can be seen in FIG. 3. Notably, higher weight fraction of precipitated cobalt ferrite also results in larger average particle size, as can also be seen in FIG. 3.

The size of the magnetic nanoparticles decorating the cellulose nanofibrils of the present invention is from about 2 to about 100 nm, or about 2-50 nm, or about 20-40 nm, or about 40-80 nm, measured as the number average diameter.

The concentration of the metal ion solution influences the size of the nanoparticles obtained by the method. Increasing the concentration of the metal ion solution from 3 to 45 mM, corresponding to about 10 to about 60 wt %, leads to larger average particle size and broader size distributions. Typically, at a metal ion concentration of 12 mM, the precipitated nanoparticles are of the size 15-20 nm, measured as the number average diameter. At a metal ion concentration of 45 mM, the size of the the precipitated nanoparticles are of the size 40-80 nm, measured as the number average diameter. Also smaller separated inorganic particles with a size of approximately 2-3 nm may simultaneously be present.

Figure 4:
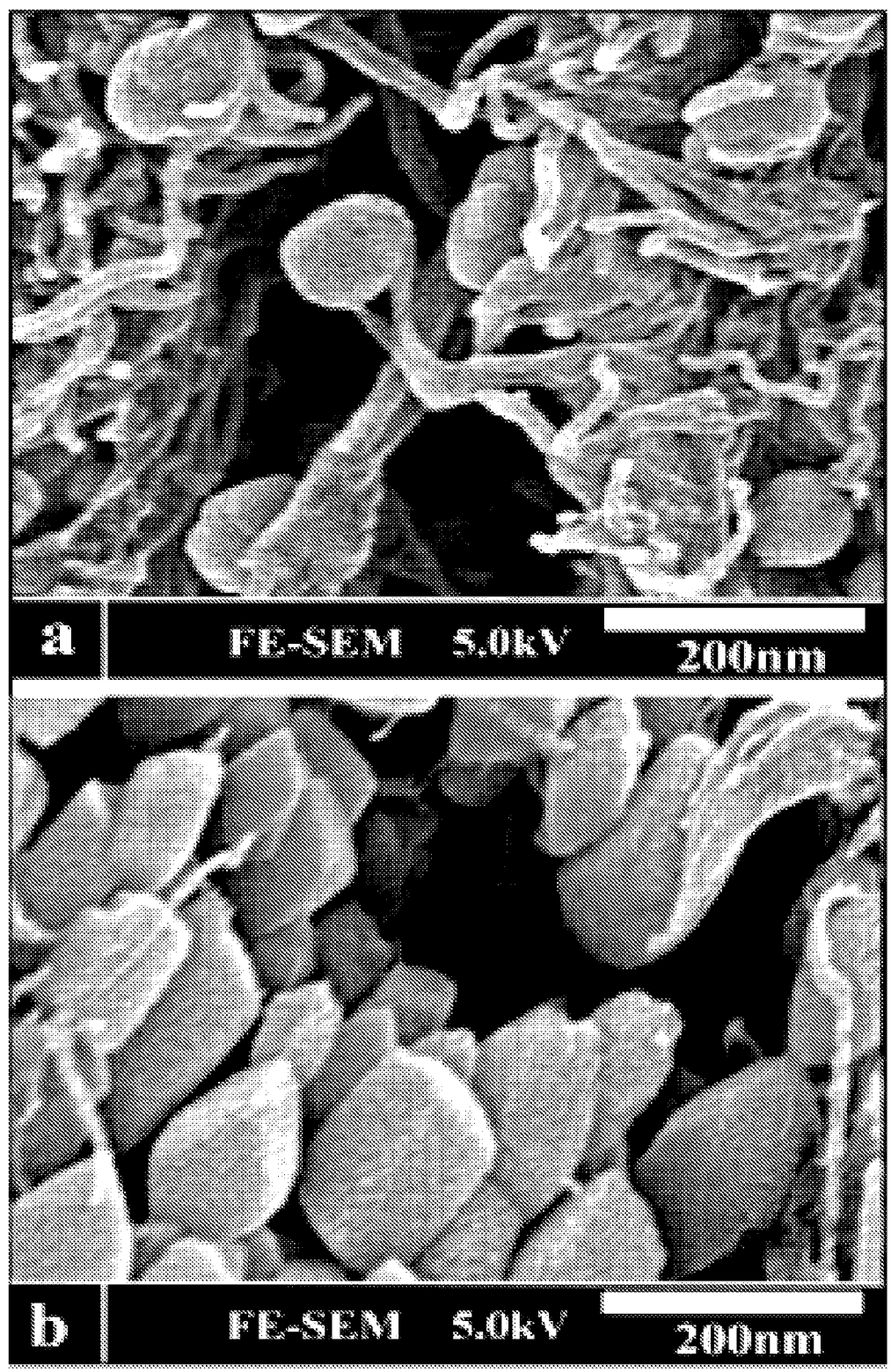
FIG. 4 presents FE-SEM micrographs of the hybrid composite membranes at high magnification showing different nanoparticle shape after in-situ (a) and separate (b) precipitation

Nanoparticles precipitated on the cellulose nanofibrils according to the present invention shows a more narrow particle size disitrbution than nanoparticles that are precipitated before they are mixed with cellulose fibrils. Further, nanoparticles precipitated on the cellulose nanofibrils presents a different, more spherical character than the predominantly cubic shaped particles obtained for precipitation of nanoparticles in absence of cellulose fibrils. See FIG. 4 for an example.

The nanoparticle-decorated nanofibrils of the present invention offer several advantages over an approach where preformed nanoparticles are simply mixed and dried. In the cellulose nanofibrils of the present invention the nanoparticles are evenly distributed over the nanofibrils, functionalizing them and offer a wide range of possibilities for further processing including papermaking processes.

In one embodiment of the present invention the magnetic nanoparticles are distributed along the nanofibril at a particle to particle inter-distance of at about the same length as the corresponding particle diameter, and the magnetic nanoparticles are uniformly distributed on to the cellulose nanofibril.

In a further embodiment of the present invention the magnetic nanoparticles are distributed along the nanofibril at a distance of about 20 nm particle to particle inter-distance, and the magnetic nanoparticles are uniformly distributed on to the cellulose nanofibril.

In a further embodiment of the present invention the magnetic nanoparticles are distributed along the nanofibril at a distance, wherein the collection of magnetic nanoparticles adhering together or lying very close together, i.e. ≤5 nm particle to particle inter-distance, is composed of less than 20 magnetic nanoparticles. Preferably the amount of magnetic nanopartides adhering together or lying very close together, i.e. ≤5 nm particle to particle inter-distance, in a collection composed of 20 or more magnetic nanoparticles, is less than 30%.

The inherent properties of cellulose nanofibrils include strong interfibril interactions, network formation, high aspect ratio and high tensile strength combined with flexibility in bending. These features provide high strength and toughness to decorated nanofibril membranes of high inorganic content, not achievable in classical polymer matrix nanocomposites.

The cellulose nanofibrils decorated with magnetic nanoparticles are stabilized in aqueous suspension, which can be further diluted or alternatively form a gel at lower water contents.

Water molecules indeed act as plasticizer in the cellulose nanofibril network by influencing nanofibril properties and reducing nanofibril interactions. High strength is nevertheless preserved due to good stress transfer between the long and slender physically entangled nanofibrils. It is possible to vary the mechanical properties by controlling the cellulose nanofibril interaction.

The method for the preparation of the cellulose nanofibrils of the present invention is environmentally benign in that the chemistry is water based. The method is also unique in its single-step preparation characteristics, and is beneficial from the facile up-scaling potential and its inexpensive characteristics. Finally, the method and the cellulose nanofibrils disclosed herein can be extended to other systems with transition metal oxide nanoparticles, providing potential for a wide range of extended properties.

The magnetic nanoparticle cellulose nanofibrils can be characterised as the collection of nanoparticles adhering together or laying very close together, i.e. ≤5 nm particle to particle inter-distance and an entity is composed of less than 20 nanoparticles.

The magnetic nanoparticle cellulose nanofibrils of the present invention, can further be characterised in that the nanofibre diameter is in the range of 1-100 nm, typically in the range of 4-20 nm.

The magnetic nanoparticle cellulose nanofibrils can further be characterised in that the weight fraction of magnetic nanoparticles on the final magnetic cellulose nanofibrils is in the range of from about 1 to about 90 wt %, preferably from about 10 to about 90 wt %, more preferably from about 10 to about 60 wt %.

The method wherein the stoichiometric relation between the metal ion complexes are in the range of 1:1.5 to 1:2.5.

An advantage with the nanoparticle decorated cellulose nanofibrils of the present invention is that it provides a magnetic nanoparticle cellulose material that is free from agglomerates, wherein the magnetic nanoparticles are extremely uniformly distributed throughout the complete material compared with previously known magnetic materials. Further, the magnetic properties of the material can be tailored for each intended use.

Nanocomposites based on magnetic nanoparticles are considered to be among the most difficult to produce due to the addition of magnetoelastic interactions such as exchange isotropic and anisotropic), super exchange, dipole-dipole interactions in addition to the chemical interactions such as van der Waals attractions. Eliminating these forces, which cause interactions in agglomerates, results in composites behaving significantly different from ferromagnetic composites based on agglomerated nanoparticles. A composite based on non-agglomerated nanoparticles have properties such as reflecting the individual magnetic nanoparticles with single domain character.

The direct inorganic modification of cellulose nanofibrils provided for in the method according to the present invention enables a uniform distribution of nanoparticles in fiber composites in absence of surfactants or particle surface modifications.

Figure 11:
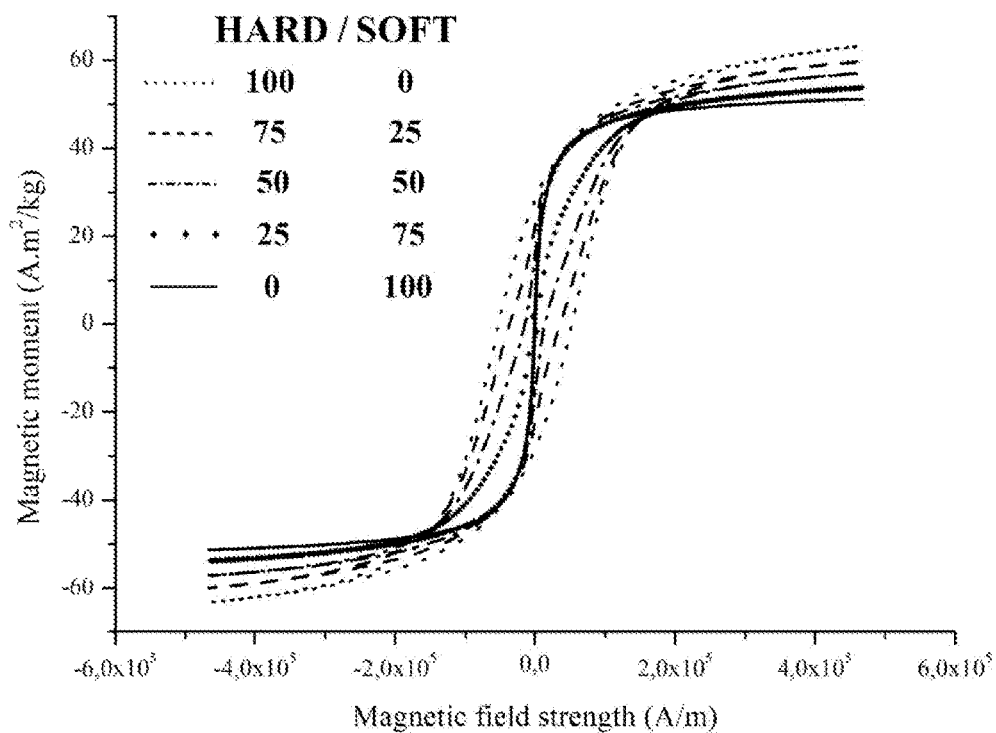
FIG. 11 shows magnetization curves for hard ($CoFe_2O_4$)-soft ($MnFe_2O_4$) composites at various compositions (a) and comparison of experimental to calculated data for the 50-50 composite (b). All sample contained 70 wt % cellulose nanofibril—all curves are normalized to the inorganic mass.
Figure 11:
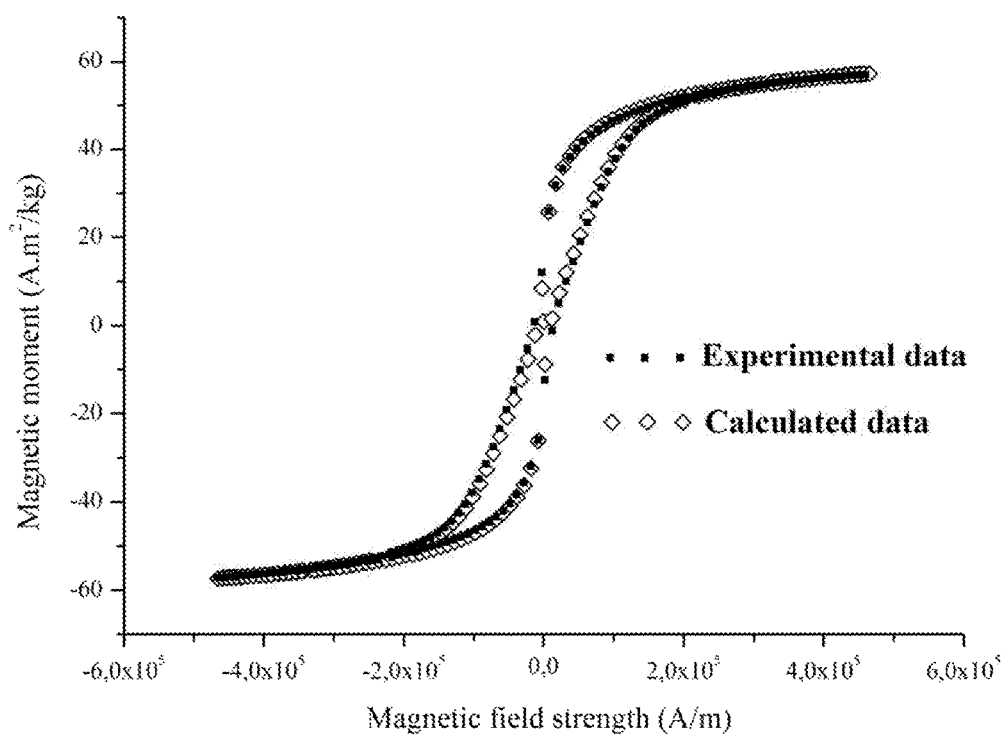

An advantageous effect of the present invention is that cellulose nanofibrils decorated with hard magnetic nanoparticles can be mixed with nanofibrils decorated with soft magnetic nanoparticles in order to tailor the magnetic properties of the membranes, which is demonstrated in FIG. 11. In this way the properties of the resulting material can be cusomized for each intended purpose. A wide range of magnetic materials based on various nanostructures can be envisioned, with the possibility to tune functional and structural properties.

It is possible to easily prepare magnetic nanocomposite membranes with desired magnetic properties, by both acting on the precipitation parameters (FIG. 10) and/or mixing suspensions of various magnetic properties to yield the desired characteristics (FIG. 11). The magnetization curves correlate with nanoparticle size distributions.

In one aspect the present invention relates to a magnetic suspension comprising a cellulose nanofibril decorated with magnetic nanoparticles that are uniformly distributed along the nanofibril.

Another aspect of the present invention is a nanocomposite comprising a magnetic material according to the present invention. The present invention also relates to a magnetic membrane, for example a loud-speaker membrane, comprising such nanocomposite.

A further aspect of the present invention is the use of the cellulose nanofibril according to the first aspect in a nanocomposite, preferably in a magnetic membrane.

The magnetic material comprising cellulose nanofibrils decorated with magnetic nanoparticles can be used within the acoustical industry, for example in a loud-speaker membrane; magnetic filtration systems; chemical analysis methods; separation methods; etc.

In traditional loudspeaker the voice coil is bonded to a geometrically shaped acoustic membrane, which is suspended in a magnetic field of a bulky permanent magnet. With a magnetic membrane according to the present invention the external magnet would not be necessary since the magnet instead may constitute an integral part of the acoustically active membrane, whereas the coil carrying the signal current and driving the membrane could be kept stationary to avoid any moving electrical parts. Thus, the combination of magnetic and mechanical functionality of a magnetic membrane according to the present invention enables the construction of super-thin loudspeakers. The construction is possible due to the advantageous mechanical properties of the magnetic membrane according to the present invention, such as high stiffness and strength, in combination with its ferromagnetic characteristics from the magnetic nanofibrils.

Applications for the decorated nanofibrils with high surface area and stability in aqueous suspension of the present invention are in water purification, catalysis or biomedical applications.

Thus one aspect of the present invention is the use of the magnetic material comprising cellulose nanofibrils decorated with magnetic nanoparticles in superfine magnetic filters/sieves, magnetic filtration set-ups activated by external field, catalytic support structures high-sensitivity magnetic membranes, magnetic films with uniformly/evenly distributed nanoparticles, microwave absorbers, magnetic foams based on nanoparticles, support structure for ferrofluid based dampeners and template structures for fabrication of nanocomposites characterized by evenly distributed nanoparticles, i.e. sensitive electromagnetic switches, generators, magnetic actuators, magnetic storage media, etc.

The following examples are intended only to further illustrate the invention and are not intended to limit the scope of the invention which is defined by the claims.

EXAMPLES

Extraction of Cellulose Nanofibrils from Wood Pulp

Never-dried commercial pulp (Nordic Paper, Sweden) was used as starting material (hemicellulose and lignin contents of 13.8% and 0.7%, respectively). The indicated DP was 1200. The cellulose nanofibrils were extracted following a previously reported procedure (Henriksson, M. et al., *Eur Polym J*, 2007, 43, 3434), including enzymatic pre-treatment in a water bath at 50° C. for 2 h with a solution of endoglucanase enzyme (Novozym 476) at 0.25% (0.1 mL enzyme/40 g dry content cellulose). Enzymatic treatment was followed by 8 passes through a microfluidizer (Microfluidics Ind., USA) to apply sufficient shear forces to fibrillate the cellulose fibers down to the nanoscale. A nanofibril suspension with 1.6 wt. % solid content (gel-like) was obtained.

Example 1

In Situ Preparation by Co-Precipitation of Cobalt Ferrite Nanoparticles on Cellulose Nanofibrils Reagent grade salts were purchased from Sigma-Aldrich and used as delivered: iron (II) sulfate heptahydrate, cobalt (II) chloride hexahydrate, potassium nitrate and sodium hydroxide with a purity>97%. The cobalt-ferrite co-precipitation reaction has been described and investigated thoroughly in previous studies (Olsson R. T., et al., *Nat Nanotechnol*, 2010, 5, 584; and Olsson, R. T., et al., *Chem Mater*, 2005, 17, 5109).

The nanofibril suspension was diluted to 0.3 wt % in 1.2 L of distilled water to decrease the viscosity, and then further subjected to ultrasound (Vibracell, Sonics, USA) two times 5 minutes in order to improve the dispersion and liberation of the individual nanofibrils.

Iron sulfate and cobalt chloride were added under high-shear mixing (Ultra-turrax D125 Basic, IKA, Germany) to the suspension of cellulose nanofibrils (1.2 L) prepared above. The stoichiometric ratio of cobalt to iron was 1:2. The co-precipitation was performed with different amounts of metal salts in order to vary the final relative amount of nanoparticles on the hybrid composites. The targets were 10 wt %, 30 wt % and 60 wt % nominal loading of inorganic contents along the fibers, corresponding to 3, 12 and 45 mM of metal salts, dissolved into the fibril suspension.

Separately, sodium hydroxide and potassium nitrate (reagent grade) were dissolved in 0.4 L of distilled water in ambient air to obtain an alkaline solution. The ratio $[Me^{2+}]/[OH^-]$ and $[Me^{2+}]/[KNO_3]$ were kept constant and equal to ½ and ⅓, respectively.

The suspension of nanofibrils and the alkaline solution of sodium hydroxide and potassium nitrate were heated up separately to 90° C. under mechanical stirring in an oil bath (200 rpm, Memmert, Germany), and the alkaline solution was then quickly poured into the metal-cellulose preparation under strong mechanical stirring (500 rpm). The reaction time was 6 h at 90° C. to ensure complete conversion of the metal oxide-hydroxide complexes to the spinel ferrite phase. The modified fibers were rinsed and cleaned from the metal salt counter ions with distilled water a minimum of 4 times. The processing route is represented in FIG. 1.

Cellulose Material

The precipitation of ferrite nanoparticles in the presence of cellulose nanofibrils ("in-situ") resulted in complete condensation of the inorganic phase onto the cellulose crystals. No particle sediment was present as separated from the suspension of fibers with grafted inorganic particles even after long periods of time (2 months), or after exposure to strong magnetic fields (a 20 $cm^3$-1.2 T magnet placed under the suspensions) or ultrasonication (estimated energy 300 W during 2 min). The functionalized nanofibril suspensions had a solid content in the range 0.1-0.5 wt. % depending on inorganic content. The micrographs in FIG. 2 show the morphology of the hybrid nanofibrils from a diluted suspension after ultrasonication (estimated energy: 300 J/mL-amplitude: 25 μm). These cellulose nanofibrils contained 30 wt % inorganic phase. The resistance against fragmentation shows that the nanoparticles are strongly attached to the nanofibrils, enough to withstand the harsh conditions during ultrasonication.

The presence of ferrite nanoparticles along the individual nanofibrils was characteristic for all samples, see FIG. 2, independent of fraction of inorganic phase.

Example 2

Separate Preparation

Separate nanoparticle samples were made by performing the same reactions as for the in situ preparation, i.e. same salt concentrations, procedure and conditions, in the absence of cellulose. Dry content of each sample was estimated by gravimetry oven drying of 5 ml aliquot samples at 105° C. for 24 h. The separately prepared nanoparticle suspensions were then mixed with the different amounts of NFC to prepare membranes with the same fractions of nanoparticles as for the in-situ modified nanofibrils, i.e. 10, 30 and 60 wt % inorganic phase.

Example 3

Reference Samples

A 0 wt % inorganic phase reference sample of cellulose was obtained by subjecting the cellulose nanofibril suspension to the same conditions as in the in-situ preparation but in absence of metal salts, the pH being fixed at 10 by the addition of NaOH.

Particle Size

The formation of inorganic nanoparticles during the forced hydrolysis reaction of the metal ion solution was affected by the presence of the fibrils. Primarily, the particles prepared in presence of the cellulose nanofibrils, referred to as "in situ preparation" (Example 1), showed significantly smaller average sizes as well as more narrow size profiles (see FIG. 3) compared with particles obtained during synthesis in absence of fibrils using the same metal ion concentrations, referred to as "separate preparation" (Example 2). Note that higher weight fraction of precipitated cobalt ferrite also results in larger average particle size. The average particle size is highest for 60 wt % followed by 30 wt % and 10 wt %.

Example 4

Membrane Preparation by Vacuum Filtration

The formation of large cellulose nanopaper sheets were made by vacuum filtration and further drying in a vacuum oven at 93° C. (Rapid-Köthen, Frank-PTI, Germany) as reported by (Sehaqui et al, *Biomacromolecules*, 2010, 11, 2195). The magnetic nanofibril suspensions, referred to as "in situ preparation" (Example 1), were diluted to 0.2 wt. % and high-shear mixed for 10 min, immediately followed by filtration through a 0.65 μm pore size membrane (Millipore). Enough of material was used to prepare membranes with thickness in the range 50-70 μm. The nanoparticle suspensions without cellulose fibers were mixed with the corresponding amounts of NFC to form samples referred as "separate precipitation" (at 10, 30 and 60 wt %) (Example 2). The samples are referred for now on respectively as "separate" and "in-situ". Two 0 wt % reference membranes were prepared with the initial untreated NFC, and with the NFC treated as described above (90° C., 6 h, pH of 10).

Figure 5:
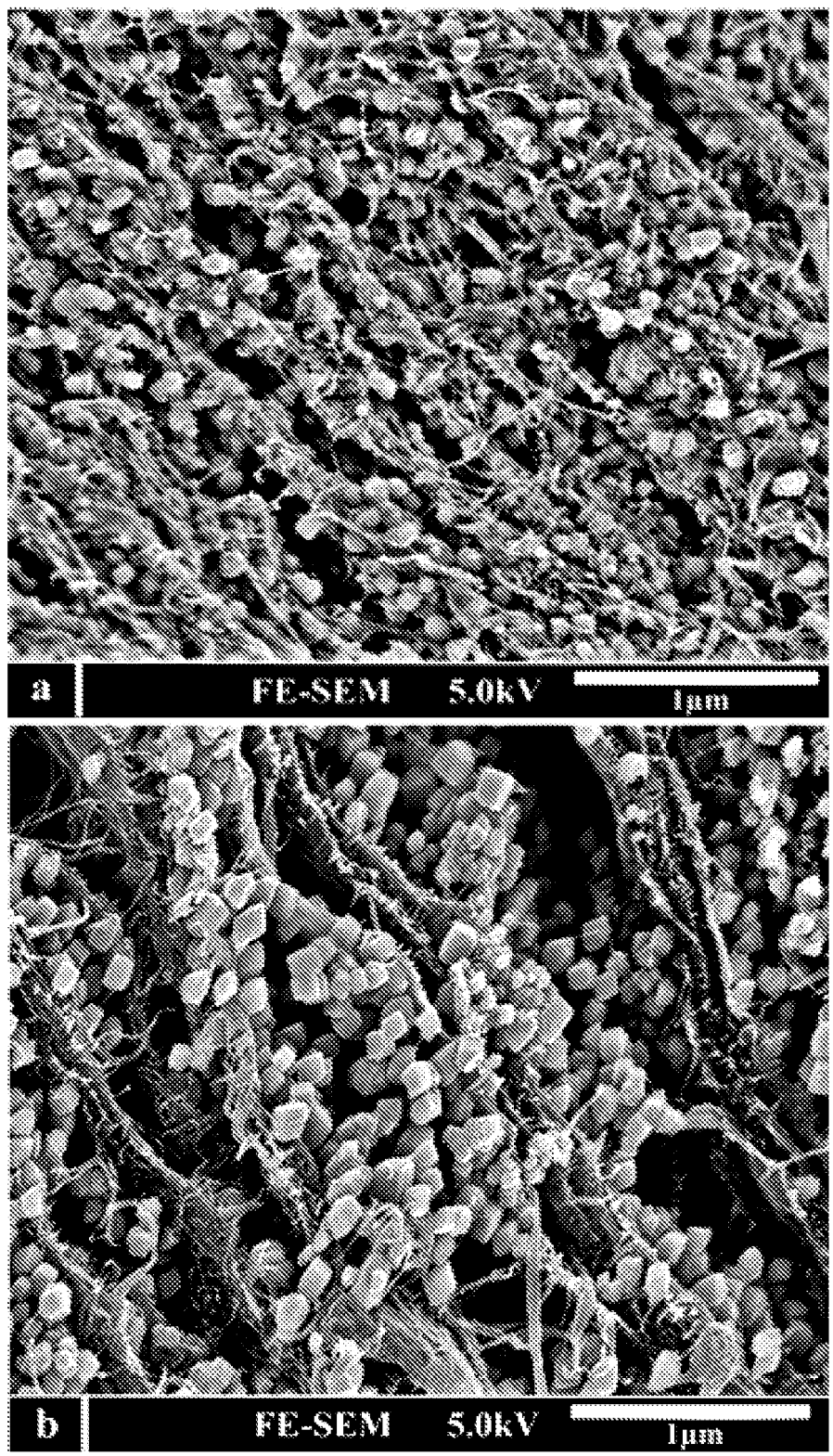
FIG. 5 shows the influence of the fibrils presence on the dispersion of the magnetic nanoparticles in the membranes prepared by a method according to the present invention (in-situ prepcipitation) (a) and by a method wherein a solvent with precipitated metal salts converted to magnetic phase has been mixed with a suspension of cellulose nanofibril (separate precipitation,) (b).

The influence of the fibrils presence on the dispersion of the magnetic nanoparticles in the membranes prepared in-situ (a) (Example 1) and by "mixing" (b) (Example 2) is shown in FIG. 5 by SEM micrographs of fractured cross-sections of cellulose nanofibril-based hybrid membranes with 60 wt % (33 vol %) of cobalt-ferrite magnetic nanoparticles.

The membranes prepared by separate synthesis as compared to in-situ precipitation primarily differ in the distribution of the particles. The separately synthesized particles formed aggregates in the membranes, located in pockets of size up to 2.5 μm between the condensed bundles of cellulose nanofibrils (FIG. 5b). Thus, only mixing with the nanofibrils allows particles to easily associate during the formation of the membranes (due to magnetic dipolar forces), whereas the in-situ prepared particles are more uniformly dispersed among the nanofibrils (FIG. 5a).

Thermogravimetric Analysis of the Magnetic Membranes

In order to confirm and obtain actual values of the nanoparticle content, TGA thermograms were recorded. Samples from the different membranes were analyzed in a Mettler-Toledo thermogravimetric analyzer (TGA/SDTA851) under a 50 ml/min $O_2$ flux. The heating rate was 10° C./min. After a first ramp to 100° C., the temperature was held for 10 min to remove loosely bound residual water in the samples, followed by a second ramp to 120° C. and another 10 minutes at this temperature to eliminate all water. The mass at this point was taken as the reference dry mass. The analysis was completed by a third ramp up to 550° C. to ensure complete degradation of the cellulosic material.

Figure 7:
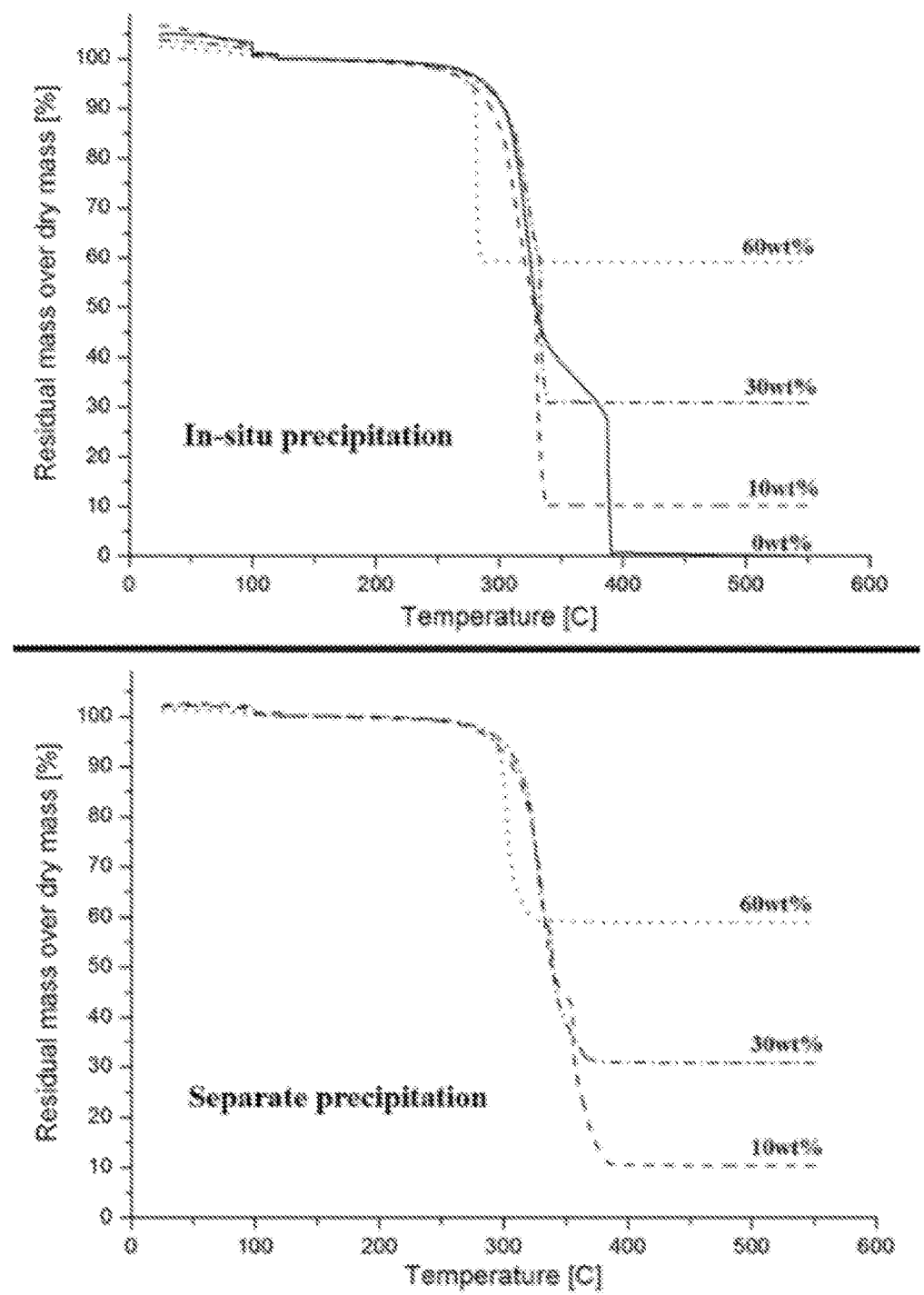
FIG. 7 shows thermograms for samples with different amount of magnetic nanoparticles and prepared through the single-step i.e. in-situ prepcipitation, (up) or two-step, i.e. separate precipitation, (down) preparations. TGA was run in the presence of $O_2$.

Degradation of the cellulose was observed to start around 250° C. and to be completed above 350° C. in the composites (FIG. 7). The mass of cobalt ferrite nanoparticles is not affected at the temperatures involved. The nanoparticle content is therefore readily calculated and reported in Table 1, in good accordance with the targeted concentrations.

Mechanical Properties of the Membranes

Thin strips (50-70 μm) of the membranes were tested in an Instron 5944 mechanical testing system at 50% RH and 23° C., with a procedure adapted from the ASTM D882 standard. The strip width was in the range 4-5 mm and each specimen was accurately measured with a micrometer and a thicknessmeter (Mitutoyo, Japan). The gauge length was set to 25 mm and the cross-head displacement was 10% per min. A minimum of 6 specimens was tested for each experimental condition.

Figure 8:
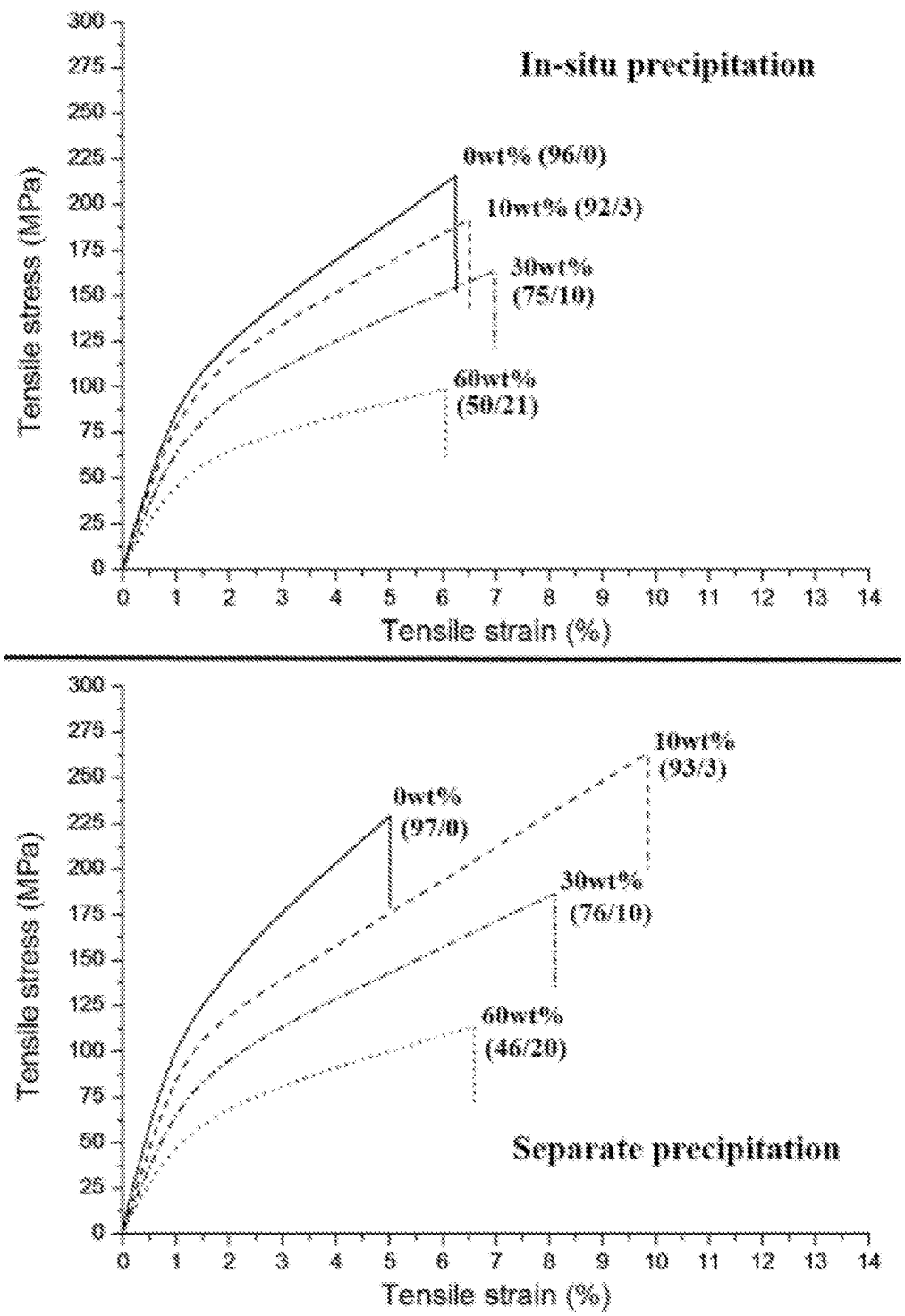
FIG. 8 shows representative stress-strain curves for the cellulose nanofibril-based hybrid membranes with varying content of magnetic cobalt-ferrite nanoparticles, prepared through single-step, i.e. in-situ prepcipitation, (up) and two-step, i.e. separate precipitation, (down) process.

Stress-strain curves for the different membranes are plotted in FIG. 8, showing the effect of nanoparticles on the mechanical properties of the materials. On the graphs in brackets, read the following: ("cellulose volume fraction"/ "inorganic volume fraction"). This information is important since mechanical properties of composites correlate with volume fractions of the components. Numerical values for the physical mechanical properties are summarized in Table 1. A decrease in strength and stiffness was observed with increasing nanoparticle content, regardless of processing route. The membranes with 10 wt % separately prepared and mixed nanoparticles (93/3—volume fraction of cellulose/ volume fraction of nanoparticles) were the toughest and strongest, with strength as high as 260 MPa. The comparative value was 190 MPa for the single-step "in-situ" process at this concentration (10 wt %, 92/3). At the highest inorganic content, i.e. 60 wt % (50/21), the Young's modulus remained in the range of 5 GPa but the strength decreased to about 100 MPa, which still surpasses most of the polymer/ nanoparticle composites prepared by traditional processing techniques from engineering polymers (Z. Guo, et al., *Compos Sci Technol*, 2008, 68, 1513; and B. Wetzel, et al., *Compos Sci Technol*, 2003, 63, 2055). In essence, the nanofibril network provides efficient stress-transfer in the material, avoiding early fracture usually encountered with nanoparticle-loaded composites (due to stress concentration around aggregates). Similarly sized ferrite nanoparticles in engineering polymer matrix resins typically show a reduction on the order of 80% and 60% for the work-of-fracture and strain to failure with the inclusion of around 20 wt % particles (R. T. Olsson, et al., *Polym Eng Sci*, 2011, Article in Press). These numbers are only 50% and 5%, respectively, for the present membranes prepared with as much as 60 wt % nanoparticles. Notably, the work to fracture determined from the area under the stress-strain curve ("Toughness" in Table 1) of these fibril-based nanoparticle composites is several times higher than for nanocomposites from most classical engineering polymers. Nevertheless, due to the presence of nanoparticles, the condensation of the cellulose nanofibril network into a dense film was altered. As shown in Table 1, an increase in porosity was observed when the amount of nanoparticles increased, explaining the reduction in strength and stiffness. The relation between Young's modulus and estimated cellulose volume fraction is shown to follow closely a rule of mixtures approach, i.e. linear relation passing by the origin. Modulus can be estimated from NFC content alone, while nanoparticles do not contribute to the stiffness of the network. The orientation distribution of fibrils and the network structure needs to be roughly the same at the different compositions for this to apply.

In Table 1 is presented the physical-mechanical properties measured on the hybrid magnetic membranes with processing route and nanoparticle content provided. In the table "strength" denotes ultimate strength, "$\epsilon_r$" denotes strain to failure, and "toughness" denotes work to fracture determined from the area under the stress-strain curve.

TABLE 1

| Preparation | Nanoparticle content | | Physical properties | | Mechanical properties | | | |
|---|---|---|---|---|---|---|---|---|
| | weight (%) | volume (%) | density (g/cm$^3$) | porosity (%) | E (GPa) | Strength (MPa) | $\epsilon_r$ (%) | Toughness (MJ/m$^3$) |
| In-situ | 0.0 | 0.0 | 1.40 | 4.0 | 10.2 | 214.8 | 6.1 | 8.7 |
| | 10.2 | 3.1 | 1.50 | 4.7 | 9.5 | 187.2 | 6.4 | 8.1 |
| | 30.9 | 9.6 | 1.56 | 15.5 | 7.9 | 160.1 | 6.9 | 7.5 |
| | 59.1 | 21.3 | 1.77 | 29.2 | 5.2 | 96.0 | 5.8 | 3.9 |
| Separate | 0.0 | 0.0 | 1.42 | 3.1 | 12.0 | 231.7 | 5.2 | 8.0 |
| | 10.4 | 3.2 | 1.52 | 3.6 | 10.0 | 259.7 | 9.3 | 15.6 |
| | 30.9 | 10.1 | 1.61 | 13.8 | 7.8 | 189.4 | 8.2 | 10.2 |
| | 59.0 | 19.9 | 1.65 | 33.8 | 5.6 | 109.7 | 6.3 | 4.8 |

Mechanical Testing at Different Humidity Conditions

The nature of cellulose is to interact strongly with water and moisture. To assess this effect on mechanical properties in the case of the in-situ prepared hybrid magnetic membranes, mechanical tests were performed after conditioning at different relative humidity.

Three different conditionings were evaluated. A first set of specimens was conditioned for 1 week in a regulated climate room (50% RH, 23° C.) before testing. Another two sets were placed in chambers at less than 2% RH and more than 98% RH, respectively, for 2 weeks conditioning before testing.

The density of the materials was obtained from thickness, mass and area measurements (from image analysis of black and white photographs). The porosity could be then calculated assuming a cellulose nanofibrils and cobalt-ferrite nanoparticles density of 1460 and 4900 kg/m$^3$ (Sun, C. C., *Int J Pharm*, 2008, 346, 93; and Olsson, R. T., et al., *Chem Mater*, 2005, 17, 5109), respectively.

Figure 9:
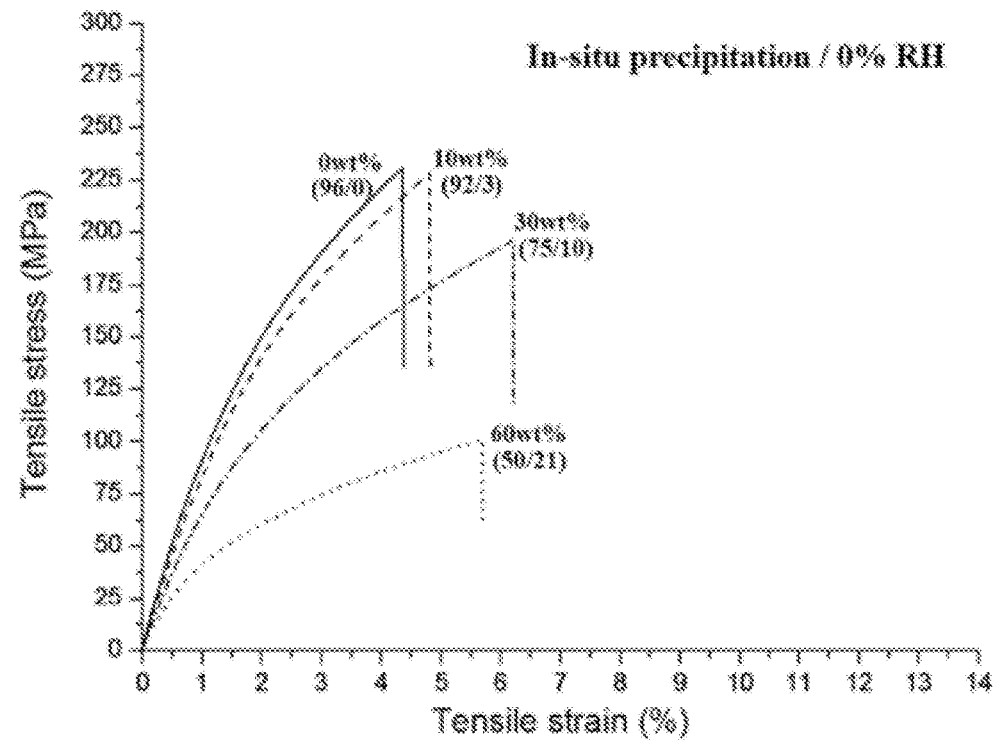
FIG. 9 shows representative stress-strain curves for membranes obtained through the single-step process, tested at two different levels of relative humidity.
Figure 9:
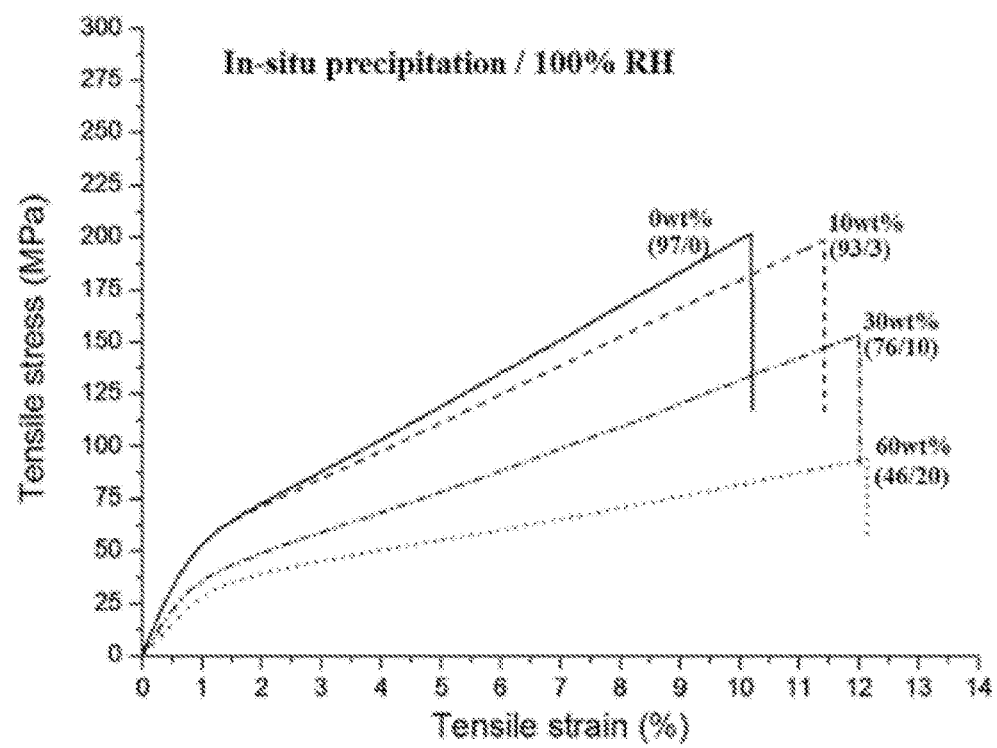

Representative stress-strain curves after conditioning at different relative humidity are presented in FIG. 9. The trend is not dependent on the amount of nanoparticles introduced, with a stiffer and more brittle material in the dry state and a softening and higher ductility at higher relative humidity. Water molecules indeed act as plasticizer in the cellulose nanofibril network by influencing nanofibril properties and reducing nanofibril interactions. High strength is nevertheless preserved due to good stress transfer between the long and slender physically entangled nanofibrils.

Scanning and Transmission Electron Microscopy

Field-emission scanning electron microscopy (FE-SEM, Hitachi S-4300) was used to observe fracture cross-sections of the membranes and the individual functionalized nanofibrils. A few nanometer thin (1-3 nm) gold-palladium layer was sputtered (Cressington 208HR, UK) on the samples to reduce electrical charging of the cellulose nanofibrils.

The individual functionalized nanofibrils were studied as deposited on a mica substrate as derived by a layer-by-layer assembly method. A positively charged Polylysine (Ted Pella, 0.1 wt %) layer was first deposited on the mica substrate by applying a drop of the polymer solution 3 min on the surface, followed by rinsing with distilled water and drying under gentle N$_2$ flux. The procedure was then repeated with a suspension of functionalized nanofibrils diluted to 0.001 wt %, sonicated for 20 s at 150 W with a 6 mm microtip (VCX750, Sonics, USA). The negative charges present at the surface of both cellulose nanofibrils and ferrite nanoparticles ensured deposition and attachment to the mica surface.

Transmission electron microscopy was used to determine particle size distribution. Decorated cellulose nanofibrils from the as-prepared suspension were observed in TEM after solvent exchange to ethanol and sonication. These micrographs were also used for size distribution determination.

Magnetic Characterization of the Membranes

Magnetic characterization was performed in a vibrating sample magnetometer (VSM, Oxford Instruments, UK). The applied field strength was varied in the range±500 kA/m and the measurements were performed on thin strips of the prepared membranes initially demagnetized. Data is normalized to the mass of nanoparticles (derived from weighing of membranes and results from TGA analysis).

Figure 10:
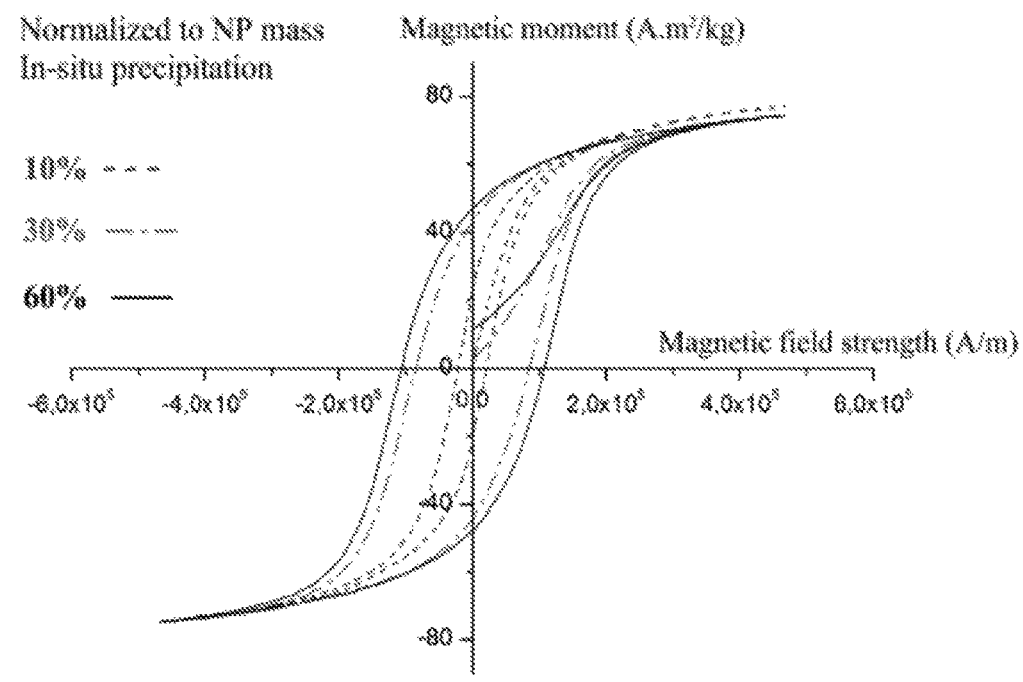
FIG. 10 shows magnetization curves for the cellulose nanofibril-based hybrid membranes with varying content of magnetic nanoparticles, prepared through single-step (up) and two-step (down) process.
Figure 10:
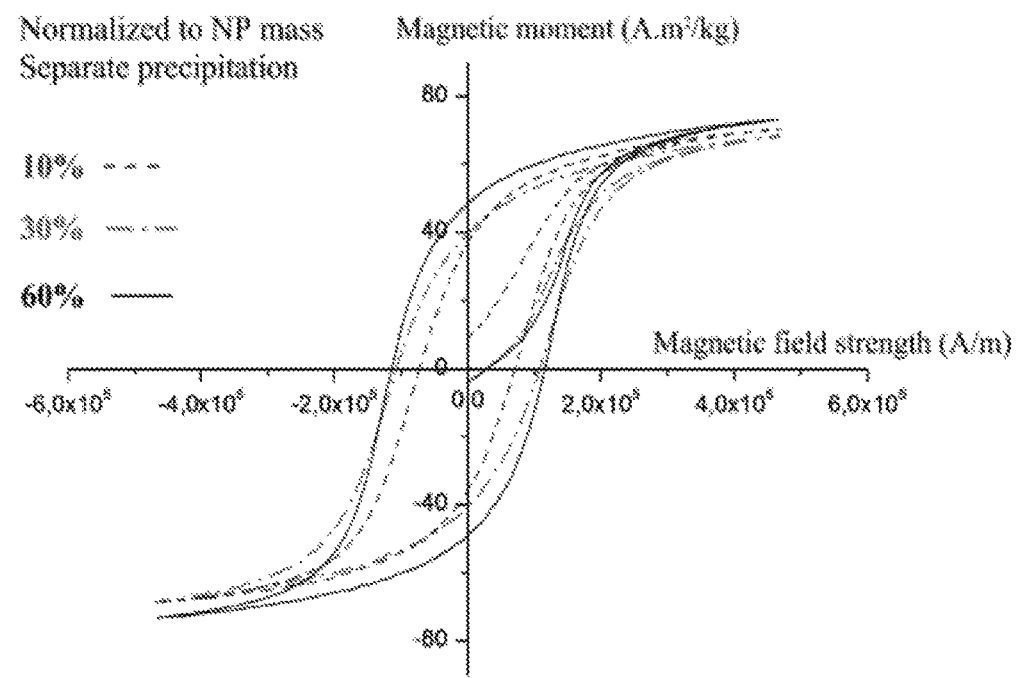

Magnetization curves of the different materials can be found in FIG. 10, where data has been normalized to the nanoparticle mass. Numerical values for the magnetic properties are reported in Table 2. Notably, the in-situ prepared particles have larger magnetization and lesser coercivities, in particular for the 10 wt % sample which most likely is due to a larger fraction of very small particles below the superparamagnetic limit. Since magnetic properties for small particles are rather size dependent, a TEM determination of size distributions was conducted, reported in FIG. 3 and Table 2. The profound difference between the in-situ and "separate" processes highlights the influence of spatial crowding in the presence of nanofibrils on nanoparticle growth. The in-situ process has a very distinct median particle size whereas the "separate" process gives a much broader distribution. The presence of the nanofibrils in the suspension might be regarded as a variation of confined or template precipitation. This should also contribute to prevent agglomeration of particles. Generally, magnetization and coercivity values compares favourably with literature data (S. C. Goh, et al., *Mater Chem Phys*, 2010, 120, 31) in particular since magnetization values are below saturation.

Table 2 shows the magnetic properties and nanoparticle sizes for the hybrid magnetic membranes depending on processing route and nanoparticle content. Ms is the magnetization at saturation, Hc is the coercivity, Mr is the remanent magnetization.

TABLE 2

| Preparation | Nanoparticle (NP) content | | Average NP size | Magnetic properties | | |
|---|---|---|---|---|---|---|
| | weight % | volume % | (nm) TEM | Ms (A·m$^2$/kg) | Hc (kA/m) | Mr (A·m$^2$/kg) |
| In-situ | 10.2 | 3.1 | 11 | 77.3 | 21.2 | 21.3 |
| | 30.9 | 9.6 | 21 | 74.5 | 85.5 | 43.7 |
| | 59.1 | 21.3 | 42 | 74.3 | 106.8 | 47.4 |
| Separate | 10.4 | 3.2 | 26 | 70.3 | 72.0 | 36.3 |

TABLE 2-continued

| Preparation | Nanoparticle (NP) content | | Average NP size | Magnetic properties | | |
|---|---|---|---|---|---|---|
| | weight % | volume % | (nm) TEM | Ms (A·m²/kg) | Hc (kA/m) | Mr (A·m²/kg) |
| | 30.9 | 10.1 | 40 | 68.5 | 107.9 | 40.1 |
| | 59.0 | 19.9 | 68 | 73.2 | 115.2 | 48.7 |

Example 5

Tuning of the Magnetic Properties

Two independent novel batches of magnetic nanofibrils were also prepared following the same experimental procedure as above. One batch with "hard" cobalt-ferrite decorated nanofibrils with similar characteristics as the material described for the "in situ" preparation above, and a second batch with "soft" manganese-ferrite decorated nanofibrils ($MnCl_2$ replaced $CoCl_2$ in the experimental route). By simple mixing of the two suspensions in controlled proportions prior to membrane formation (the total cellulose amount is 70 wt % in all composites), composites with tailored magnetic properties were fabricated (FIG. 11a). Furthermore, high predictability of composites' hysteresis curves could be achieved from the "100% hard" and "100% soft" components' curves by using a simple rule of mixture for the magnetic moment (FIG. 11b), given in Eq. (1):

$$M_{comp}(H) = W_{soft} \cdot M_{soft}(H) + W_{hard} \cdot M_{hard}(H) \quad (1)$$

with $M_i$ the magnetic moment, H is the applied field strength, and $w_i$ the weight fraction.

The accuracy in the predicted magnetic properties were ca.±0.5-3% in average over the full hysteresis loops. The hysteresis loops and magnetic data of the mixed composition membranes normalized to the nanoparticle mass) can be found in FIG. 3f and Table 2. Intermixing of different hybrid fibrils functionalized with hard ($CoFe_2O_4$) and soft ferrite ($MnFe_2O_4$) nanoparticles allowed for tuning of membrane coercive magnetic properties two orders of magnitude with great accuracy from 0.4 to 50 kA/m.

Table 3 presents the measured and predicted magnetic properties of mixed hard/soft nanocomposites.

TABLE 3

| Co/Mn* (wt %) | $M_r$ (Am²/kg) | $M_s$ (Am²/kg) | $H_c$ (kA/m) |
|---|---|---|---|
| 100/0 | 33.2 | 73.9 | 52.5 |
| 75/25 | 26.0/25.6 | 70.0/70.4 | 36.0/34.1 |
| 50/50 | 17.9/18.0 | 66.7/66.9 | 14.0/11.2 |
| 25/75 | 9.7/10.3 | 62.9/63.3 | 3.1/2.9 |
| 0/100 | 2.7 | 59.8 | 0.4 |

*Proportions of nanofibrils decorated with hard $CoFe_2O_4$ and soft $MnFe_2O_4$.
$M_r$ Remanent magnetization (measured/predicted)
$M_s$ Saturation magnetization (measured/predicted)
$H_c$ Coercivity (measured/predicted).

This is a result of additionality of magnetic moments from the hard and soft phases (P. J. Wasilewski, *Earth Planet Sc Len*, 1973, 20, 67; J. J. Becker, *IEEE T Magn*, 1982, 18, 1451; and A. P. Roberts, et al., *J Geophys Res*, 1995, 100, 17909) suggesting also the absence of exchange coupling between the two kinds of nanoparticles (L. H. Bennett et al., *J Appl Phys*, 2005, 97, 10E502), which would otherwise require the phases to come within a few atomic distances from each other.

Therefore it is possible to easily prepare magnetic nanocomposite membranes with desired magnetic properties, by both acting on the precipitation parameters (FIG. 10) and/or mixing suspensions of various magnetic properties to yield the desired characteristics (FIG. 11).

X-Ray Diffraction

X-ray diffraction was performed on a PANalytical X'pert Pro MPD. For all measurements, Cu-Kα radiation (λ=1.54178 Å) was used. Due to the strong fluorescence of the ferrite, a setup with parabolic mirror and secondary monochromator was used. The analyses were done on the unaltered diffraction patterns, i.e. no smoothing or background correction was performed. All data collections were performed at ambient temperature (299K).

Figure 6:
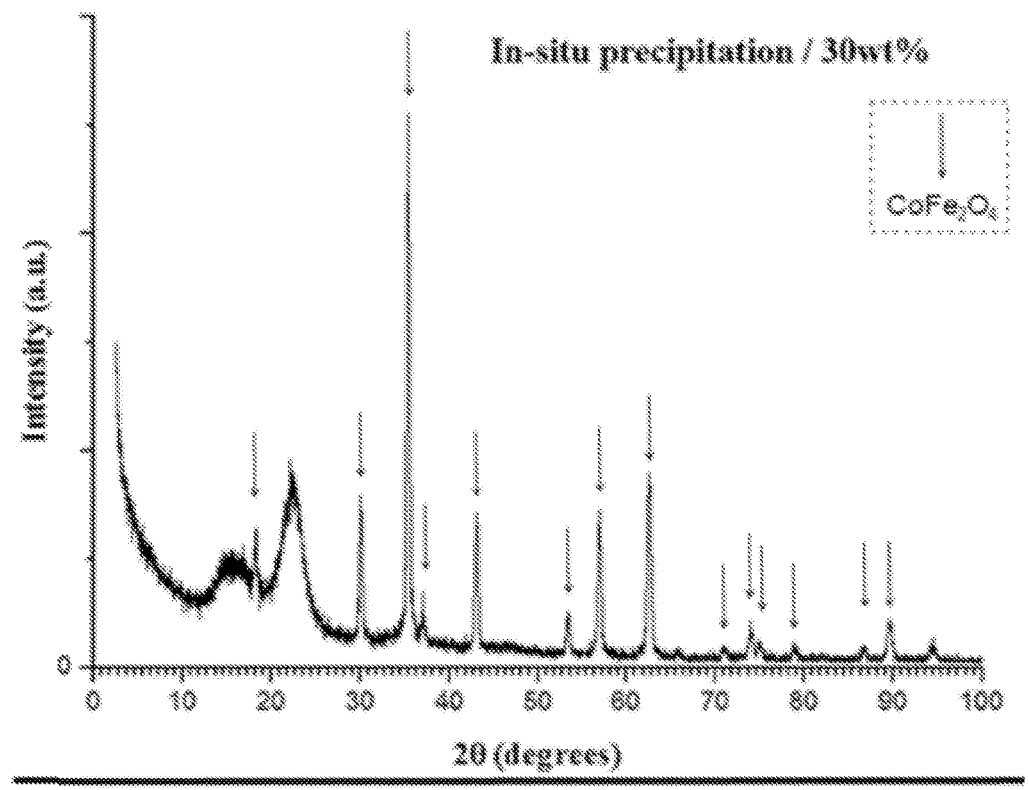
FIG. 6 shows XRD spectra of cellulose nanofibril-based hybrid membranes with 30 wt % of cobalt-ferrite magnetic nanoparticles, prepared through a single-step, i.e. in-situ prepcipitation, (a) and two-step, i.e. separate precipitation, (b) process. Peaks are assigned to the corresponding constituent as indicated on the graphs.
Figure 6:
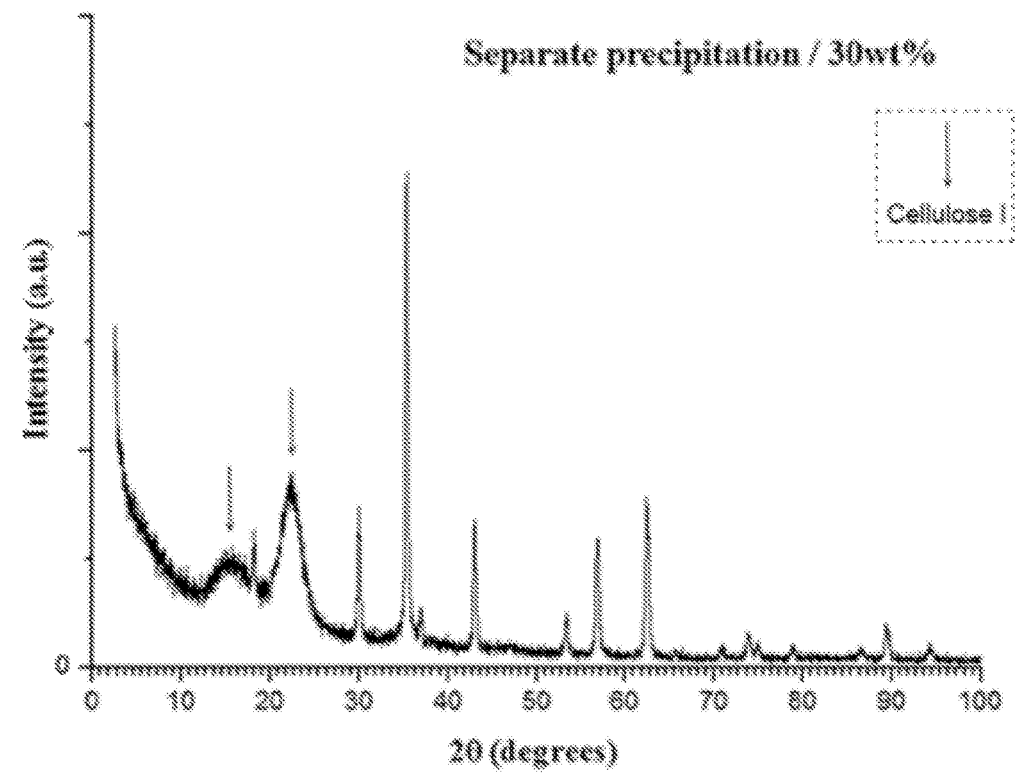

The X-ray diffraction spectra for the 30 wt % hybrid composite membranes are shown in FIG. 6. Similar spectra were obtained for all the samples. The hybrid cellulose/nanoparticle samples exhibited the characteristic peaks corresponding to the magnetic phase, and at small diffraction angles also the spectra corresponding to cellulose I. The diffraction patterns do not show any trace of oxide-hydroxide complex phase. Deeper analysis of the diffractograms shows no significant variations in the lattice parameter for the different samples, in the vicinity of 8.42 Å. As expected, the relative amplitude of the cellulose and cobalt-ferrite peaks depends on the nanoparticle content of the sample.

Example 6

Procedure for Mixing the Magnetic Nanofibrils with a Polymer

Commercial hydroxyethyl cellulose (HEC) powder is dissolved in water to a 0.1 to 1% solution. Solution is stirred until the powder is completely dissolved, such as for 24 h. Desired amount of the magnetic nanofibrils aqueous suspension is added to the HEC solution and the mixture is stirred until dissolution of the particles, such as for 3 h. The magnetic nanocomposite membrane is then formed by vacuum-filtration of the mixture, followed by drying completely using any conventional method, for example in an oven at 30-100° C.

Although the present invention has been described in considerable detail with reference to certain embodiments, one skilled in the art will appreciate that the present invention can be practiced by other than the described embodiments and examples, which have been presented for purposes of illustration and not of limitation.

The invention claimed is:

1. A cellulose nanofibril decorated with magnetic nanoparticles that are uniformly distributed on the nanofibril, wherein the nanoparticles are uniformly distributed along the nanofibril at a particle to particle inter-distance of at about the same length as the particle diameter.

2. The cellulose nanofibril according to claim 1, wherein the magnetic nanoparticle is made of transition metal compounds or an oxide thereof.

3. The cellulose nanofibril according to claim 2, wherein the magnetic nanoparticle is made of a compound selected from Co, Fe, Ni, $Fe_2O_3$, $Fe_3O_4$, $CoFe_2O_4$, $NiFe_2O_4$, $CuFe_2O_4$, $MnFe_2O_4$, and $MgFe_2O_4$.

4. The cellulose nanofibril according to claim 1, wherein the size of the nanoparticles is in the range of 2-100 nm.

5. A magnetic suspension comprising a cellulose nanofibril decorated with magnetic nanoparticles that are uniformly distributed on the nanofibril.

6. A magnetic material comprising a cellulose nanofibril according to claim 1.

7. A nanocomposite comprising the magnetic material according to claim 6.

8. A magnetic membrane comprising the nanocomposite according to claim 7.

9. A loud-speaker membrane comprising the magnetic membrane according to claim 8.

* * * * *